US012800720B2

(12) United States Patent
Dold et al.

(10) Patent No.: US 12,800,720 B2
(45) Date of Patent: Nov. 17, 2026

(54) REALITY CAPTURE WITH A LASER SCANNER AND A CAMERA

(71) Applicant: LEICA GEOSYSTEMS AG, Heerbrugg (CH)

(72) Inventors: Jürgen Dold, Sempach (CH); Burkhard Böckem, Jonen AG (CH); Roman Steffen, Rebstein (CH); Lukas Heinzle, Dornbirn (AT); Ralph Patrick Harti, Goldach (CH); Hendrik Deschout, Rorschacherberg (CH); Roland Graf, Untereggen (CH); Mattheus Henricus Maria Michels, Berneck (DE); Michael Dietschi, Mäder (AT); Adam Baijric, St. Margrethen (CH); Andrea Bonfanti, Heerbrugg (CH); Kristian Walker Morin, Buchs (CH); Simon Mark, Thal (CH); Klaus Bereuter, Alberschwende (AT); Markus Ribi, Berneck (AT); Michele Portentoso, Reute (CH); Matthias Wieser, Wendlingen (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1123 days.

(21) Appl. No.: 17/416,432

(22) PCT Filed: Jun. 7, 2019

(86) PCT No.: PCT/EP2019/065045

§ 371 (c)(1),
(2) Date: Jun. 18, 2021

(87) PCT Pub. No.: WO2020/126123

PCT Pub. Date: Jun. 25, 2020

(65) Prior Publication Data

US 2022/0373685 A1 Nov. 24, 2022

(30) Foreign Application Priority Data

Dec. 21, 2018 (EP) .................................... 18215672

(51) Int. Cl.
*G01S 7/48* (2006.01)
*G01S 7/481* (2006.01)
(Continued)

(52) U.S. Cl.
CPC .......... *G01S 7/4802* (2013.01); *G01S 7/4813* (2013.01); *G01S 7/51* (2013.01); *G01S 17/42* (2013.01);
(Continued)

(58) Field of Classification Search
USPC ........................................................ 356/5.01
See application file for complete search history.

(56) References Cited

U.S. PATENT DOCUMENTS 8,488,877 B1 7/2013 Owechko et al.
9,383,753 B1 7/2016 Templeton et al.
(Continued)

FOREIGN PATENT DOCUMENTS

CN 105391910 A 3/2016
CN 205458451 U 8/2016
(Continued)

OTHER PUBLICATIONS

European Search Report and Opinion for Application 19732276.1 (Year: 2024).*

(Continued)

*Primary Examiner* — James R Hulka
(74) *Attorney, Agent, or Firm* — Maschoff Brennan

(57) ABSTRACT

A reality capture device for generating a digital three-dimensional representation of an environment enables an object within an infrastructure to be surveyed or detected.
(Continued)

The reality capture device is compact and easy to use, allowing for fast and reliable capture. The reality capture device can be carried and moved by a mobile carrier, particularly a person, robot or vehicle, and can be moved during a measuring process for generating a digital representation of an environment. The mobile reality capture device includes a localization unit for providing a simultaneous localization and mapping functionality, a laser scanner, and a camera unit. The mobile reality capture device is configured to be carried by a user through the room. The room is surveyed during the movement of the mobile reality capture device. The data from the laser scanner and the camera unit are referenced to each other by means of the localization unit.

23 Claims, 17 Drawing Sheets

(51) Int. Cl.

| | |
|---|---|
| ***G01S 7/51*** | (2006.01) |
| ***G01S 17/42*** | (2006.01) |
| ***G01S 17/58*** | (2006.01) |
| ***G01S 17/86*** | (2020.01) |
| ***G01S 17/89*** | (2020.01) |
| ***G06T 3/4038*** | (2024.01) |
| ***G06T 7/10*** | (2017.01) |
| ***G06T 7/521*** | (2017.01) |
| ***G06T 7/55*** | (2017.01) |
| ***G06T 7/60*** | (2017.01) |
| ***G06T 7/70*** | (2017.01) |

(52) U.S. Cl.

CPC .............. *G01S 17/58* (2013.01); *G01S 17/86* (2020.01); *G01S 17/89* (2013.01); *G06T 3/4038* (2013.01); *G06T 7/10* (2017.01); *G06T 7/521* (2017.01); *G06T 7/55* (2017.01); *G06T 7/60* (2013.01); *G06T 7/70* (2017.01); *G06T 2207/10028* (2013.01)

(56) References Cited

U.S. PATENT DOCUMENTS

| | | | | |
|---|---|---|---|---|
| 9,778,037 | B2 * | 10/2017 | Bestler | G01C 15/008 |
| 9,880,263 | B2 * | 1/2018 | Droz | G01S 7/4817 |
| 10,041,793 | B2 | 8/2018 | Metzler et al. | |
| 10,057,078 | B2 | 8/2018 | Harms et al. | |
| 10,060,769 | B2 | 8/2018 | Bereuter et al. | |
| 10,254,762 | B2 * | 4/2019 | McWhirter | G05D 1/0088 |
| 10,495,756 | B2 | 12/2019 | Walsh et al. | |
| 10,639,793 | B2 | 5/2020 | Williams et al. | |
| 2004/0051711 | A1 | 3/2004 | Dimsdale et al. | |
| 2009/0002678 | A1 | 1/2009 | Tanaka et al. | |
| 2012/0019806 | A1 | 1/2012 | Becker et al. | |
| 2012/0194644 | A1 | 8/2012 | Newcombe et al. | |
| 2012/0274466 | A1 | 11/2012 | Mezger | |
| 2013/0010307 | A1 | 1/2013 | Greiner et al. | |
| 2014/0063489 | A1 | 3/2014 | Steffey et al. | |
| 2014/0064555 | A1 | 3/2014 | Sebastian et al. | |
| 2015/0029516 | A1 | 1/2015 | Neundorf et al. | |
| 2015/0085079 | A1 | 3/2015 | Gittinger et al. | |
| 2015/0098075 | A1 | 4/2015 | Bestler et al. | |
| 2016/0061954 | A1 | 3/2016 | Walsh et al. | |
| 2016/0169659 | A1 | 6/2016 | Steffey et al. | |
| 2016/0274589 | A1 | 9/2016 | Templeton et al. | |
| 2016/0291134 | A1 * | 10/2016 | Droz | G01S 7/4817 |
| 2017/0054569 | A1 * | 2/2017 | Harms | H04W 4/33 |
| 2017/0067995 | A1 | 3/2017 | Hartl et al. | |
| 2017/0095157 | A1 | 4/2017 | Tzvieli et al. | |
| 2017/0184721 | A1 | 6/2017 | Sun et al. | |
| 2018/0060465 | A1 | 3/2018 | Tocher et al. | |
| 2018/0065253 | A1 * | 3/2018 | Williams | G05D 1/0234 |
| 2018/0122091 | A1 | 5/2018 | Herbst | |
| 2018/0136319 | A1 | 5/2018 | Send et al. | |
| 2018/0136336 | A1 * | 5/2018 | Walsh | G01S 7/4817 |
| 2018/0284246 | A1 | 10/2018 | LaChapelle | |
| 2018/0284780 | A1 * | 10/2018 | McWhirter | G01S 7/4816 |
| 2018/0329066 | A1 | 11/2018 | Pacala | |
| 2019/0250251 | A1 | 8/2019 | Gibson et al. | |
| 2022/0308175 | A1 * | 9/2022 | Watson | G01S 17/931 |
| 2024/0312247 | A1 * | 9/2024 | Gorski | G06F 3/017 |

FOREIGN PATENT DOCUMENTS

| | | | |
|---|---|---|---|
| CN | 106066160 | A | 11/2016 |
| CN | 106066173 | A | 11/2016 |
| CN | 107092021 | A | 8/2017 |
| CN | 107765263 | A | 3/2018 |
| CN | 108353089 | A | 7/2018 |
| CN | 108508431 | A | 9/2018 |
| DE | 10 2016 201 057 | A1 | 7/2017 |
| EP | 2775257 | A1 | 9/2014 |
| EP | 3306346 | A1 | 4/2018 |
| EP | 3 396 403 | A1 | 10/2018 |
| JP | H03-175390 | A | 7/1991 |
| JP | 2789741 | B2 | 8/1998 |
| JP | 2003060973 | A | 2/2003 |
| JP | 2015213251 | A | 11/2015 |
| JP | 2015535925 | A | 12/2015 |
| JP | 2017208595 | A | 11/2017 |
| JP | 2018513566 | A | 5/2018 |
| JP | 2018-132482 | A | 8/2018 |
| JP | 2018119942 | A | 8/2018 |
| WO | 2018061515 | A1 | 4/2018 |
| WO | 2018071416 | A1 | 4/2018 |
| WO | 2018/110964 | A1 | 6/2018 |
| WO | 2018/140656 | A1 | 8/2018 |

OTHER PUBLICATIONS

"Visualization of underground flood information using Laser Scanner", The 79th (Heisei 29) National Convention Proceedings (4), Information Processing Society of Japan, Makoto Hirose et al., Mar. 16, 2017.

"SEQSENSE (KK)" Robotics Industry Frontline 2019 [ISBN 978-4-88353-275-9], Oct. 9, 2018.

"Laser-visual-inertial odometry and mapping with high robustness and low drift", Journal of Field Robotics, Zhang, J. et al., Aug. 23, 2018.

AU Patent Examination Report dated Jun. 7, 2024 as received in Application No. 2023203637.

Bosse, M. et al., "Zebedee: Design of a Spring-Mounted 3-D Range Sensor with Application to Mobile Mapping", IEEE Transactions on Robotics, vol. 28, No. 5, pp. 1104-1119, Oct. 2012.

Rehder, J. et al., "Spatio-Temporal Laser to Visual/Inertial Calibration with Applications to Hand-Held, Large Scale Scanning", 2014 IEEE/RSJ International Conference on Intelligent Robots and Systems (IROS 2014) Sep. 14-18, 2014, Chicago, IL, USA.

Kimoto, K. et al., "Development of Small Size 3D LIDAR," 2014 IEEE International Conference on Robotics & Automation (ICRA), pp. 4620-4626 (May 31-Jun. 7, 2014).

Kang, J. et al., "Full-DOF Calibration of a Rotating 2-D LIDAR With a Simple Plane Measurement," IEEE Transactions on Robotics, vol. 32, Issue 5, pp. 1245-1263 (Oct. 2016).

AU Patent Examination Report No. 3 dated Feb. 21, 2023 as received in Application No. 2019410856.

EP Search Report in Application No. 18215672.9 dated Jul. 3, 2019.

EP Office Action dated Oct. 29, 2024 as received in Application No. 19732276.1.

Extended European Search Report dated Feb. 5, 2025 as received in Application No. 24209760.8.

Partial European Search Report dated Feb. 5, 2025 as received in Application No. 24209981.0.

Extended European Search Report dated Feb. 13, 2025 as received in Application No. 24209984.4.

(56) References Cited

OTHER PUBLICATIONS

Extended European Search Report dated Feb. 13, 2025 as received in Application No. 24209998.4.
Extended European Search Report dated Feb. 21, 2025 as received in Application No. 24212822.1.
Partial European Search Report dated Feb. 21, 2025 as received in Application No. 24212823.9.
Nikoohemat Shayan et al: "Semantic Interpretation of Mobile Laser Scanner Point Clouds in Indoor Scenes Using Trajectories", Remote Sensing, vol. 10, No. 11, Nov. 7, 2018.
Helge A. Lauterbach et al, "Evaluation of a Backpack-Mounted 3D Mobile Scanning System," Remote Sens., vol. 7, No. 10, Oct. 21, 2015, pp. 13753-13781.

* cited by examiner

REALITY CAPTURE WITH A LASER SCANNER AND A CAMERA

BACKGROUND

The present invention relates to a reality capture device for generating a digital three-dimensional representation of an environment, particularly for surveying and/or for detecting an object within an infrastructure.

By way of example, surveying of a building and surrounding terrain is of interest for architects or craftsmen in order to quickly assess an actual condition of a room or a construction progress of a construction site, respectively, e.g. to efficiently plan the next work steps. By means of a digital visualization of the actual state, e.g. in the form of a point cloud or a vector file model, or by means of an augmented reality functionality different options for further steps or expansion options can be examined and optionally presented to an employee or a customer in an easily accessible way.

By way of another example, three-dimensional surveillance systems are used to monitor neuralgic points within a city, such as railway stations, airports, city parks, or otherwise busy public places, or to safeguard restricted or dangerous areas, e.g. industrial plants, construction sites, or business complexes. Furthermore, operation of a facility may be supported, e.g. supervision of a warehouse or a car park.

An environment can be optically scanned and measured by means of a laser scanner emitting a laser measurement beam, e.g. using pulsed electromagnetic radiation, wherein an echo is received from a backscattering surface point of the environment and a distance to the surface point is derived and associated with an angular emission direction of the associated laser measurement beam. This way, a three-dimensional point cloud is generated. For example, the distance measurement may be based on the time of flight, the shape, and/or the phase of the pulse.

For additional information, the laser scanner data may be combined with camera data, in particular to provide high-resolution spectral information, e.g. by means of an RGB camera or an infrared camera.

Typically, distance measuring modules used in surveying laser scanners are capable of detecting intensity variations but have no color sensitivity, which is why a 3D model, particularly a point cloud or vector file model, purely generated by a laser scanner may only be displayed in grayscale. As a result, many details remain hidden to a human observer due to the lack of color effect and the lack of color-supported depth effect. Therefore, often a “colored” 3D point cloud is generated by means of referencing the “gray” 3D point cloud of the laser scanner with color data from a camera, which makes the display much easier for the human eye.

The referencing and fusion of different data types, e.g. laser scanner data, camera data, and positioning data such as from a global navigation satellite system, is now increasingly standardized.

In particular, reality capture devices may be mobile and configured to provide surveying data and referencing data at the same time, e.g. wherein at least trajectory data of the device, e.g. position and/or pose data, are provided with the probing data, e.g. laser scanner data and/or camera data, such that probing data of different positions of the reality capture device can be combined into a common coordinate system. Often, reality capture devices are configured to autonomously create a 3D map of a new environment, e.g. by means of a simultaneous localization and mapping (SLAM) functionality.

The three-dimensional model data may then be analyzed by means of a feature recognition algorithm for automatically recognize semantic and/or geometric features captured by the probing data, e.g. by means of using shape information provided by virtual object data from a CAD model. Such feature recognition, particularly for recognizing geometric primitives, are nowadays widely used to analyze 3D data.

In prior art monitoring systems, laser distance measuring devices and/or light barriers provide for intrusion and/or movement detection, wherein moving objects are detected as they cross observing planes within the infrastructure. However, compared to camera imaging spatial coverage by laser scanners and/or light barriers is often limited, e.g. wherein different observing planes are only placed at entrances, e.g. doors and windows, or wherein different observing planes are at least separated by several meters.

Particular problems of prior art monitoring devices relate to the handling of changing environmental conditions such as changes in ambient light, and/or to adapting to modifications of the environment, wherein placement of allowed objects have to be distinguished from placement of disallowed objects within the infrastructure to be monitored.

A particular task of monitoring relates to the detection of left behind objects within a surveillance area, e.g. packages containing explosives or other harmful substances. However, in prior art surveying systems automatic object identification and tracking often brakes down in the case of crowded areas, i.e. areas with many different kinds of objects, wherein all of these objects can move in different directions such that frequent crossings and line-of-sight blockings occur. For example, such conditions are present in railway or subway stations.

SUMMARY

It is an object of the present invention to provide improved reality capture with a device, which is more compact and easier to use, thus allows faster and more reliable capture of various kinds environments.

This object is achieved by the realization of at least part of the characterizing features of the independent claims. Features which further develop the invention in an alternative or advantageous manner can be found in some of the other features of the independent claims and in the dependent claims.

One aspect of the invention relates to a mobile reality capture device configured to be carried and moved by a mobile carrier, particularly a person or a robot or a vehicle, and to be moved during a measuring process for generating a digital representation of an environment.

The mobile reality capture device has a localization unit, particularly comprising an inertial measurement unit (IMU), wherein the localization unit is configured for generating localization data for determining a trajectory of the mobile reality capture device.

Furthermore, the reality capture device has a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud.

In addition, the mobile reality capture device has a base supporting the laser scanner and a cover, particularly a cover which is opaque for visible light, mounted on the base such that the cover and the base encase all moving parts of the laser scanner, such that from the outside no moving parts are touchable.

In one embodiment the localization unit has an inertial measurement unit (IMU) for generating inertial data for the mobile reality capture device, the IMU comprising two inertial sensors, wherein one of the inertial sensors is mounted on a part of the laser scanner, which rotates during the measuring process, and the other one of the inertial sensors is mounted on a part of the laser scanner which is static relative to the base during the measuring process. In particular, the localization unit is configured to determine a drift in the inertial data for the mobile reality capture device by comparing data of the two inertial sensors, taking into account a rotation parameter describing the relative rotation between the two inertial sensors.

In a further embodiment the localization unit is configured that the localization data are based on at least part of the LIDAR data, particularly wherein the mobile reality capture device is configured for carrying out a LIDAR-based localization and mapping algorithm.

In a further embodiment the mobile reality capture device comprises a panoramic camera unit arranged on a lateral surface of the mobile reality capture device, the lateral surface defining a standing axis of the mobile reality capture device, namely wherein the lateral surface is circumferentially arranged around the standing axis. The panoramic camera unit is configured to provide for image data which cover a visual field of at least 120° around the standing axis, particularly at least 180°, more particularly 360°.

In particular, the panoramic camera unit comprises multiple cameras circumferentially arranged on the lateral surface and the mobile reality capture device is configured to generate from the image data a panoramic image, namely wherein individual images of the multiple cameras are stitched together to form an image having a wider field of view than the individual images.

In a further embodiment the mobile reality capture device comprises a localization camera for being used by the localization unit, particularly wherein the localization camera is part of the panoramic camera unit. The localization unit is configured that the localization data are based on image data generated by the localization camera, particularly wherein the mobile reality capture device is configured for carrying out a visual localization and mapping algorithm.

In particular, the mobile reality capture device comprises multiple localization cameras for being used by the localization unit, particularly wherein the multiple localization cameras are configured and arranged that, for a nominal minimum operating range of the localization unit, each of the multiple localization cameras has a field of view overlap with at least another one of the multiple localization cameras.

In a further embodiment the mobile reality capture device comprises, particularly as part of the panoramic camera unit, a color camera configured to capture color images, particularly wherein the mobile reality capture device is configured to provide point cloud data for generating a colored three-dimensional point cloud based on the LIDAR data and the color images.

In a further embodiment the mobile reality capture device comprises, particularly as part of the panoramic camera unit, a high dynamic range (HDR) camera, particularly a single exposure HDR camera.

In a further embodiment the mobile reality capture device comprises, particularly as part of the panoramic camera unit, a multispectral camera, particularly a hyperspectral camera.

In a further embodiment the mobile reality capture device comprises a global navigation satellite system (GNSS) transceiver.

In a further embodiment the mobile reality capture device comprises a direction determining unit for providing directions relative to the geographic cardinal directions, e.g. a compass.

In a further embodiment the laser scanner is configured that for generating the LIDAR data the two rotation axes rotate faster than 0.1 Hz, particularly faster than 1 Hz, wherein the LIDAR data are generated with a point acquisition rate of at least 300'000 points per second, particularly at least 500'000 points per second.

In particular, the laser scanner may be configured for generating the LIDAR data by adaptively setting at least two different rotation rates for at least one of the two rotation axes and/or by adaptively setting at least two different point acquisition rates.

In a further embodiment the cover provides a field of view of the laser scanner which is larger than half of a unit sphere around the laser scanner. For example, the cover has a hemispherical head part, which merges in the direction of the base in a cylindrical shell, particularly wherein the laser scanner is configured that the LIDAR data are generated based on an orientation of the laser measurement beam where it passes through the hemispherical head part and an orientation of the laser measurement beam where it passes through the cylindrical shell.

In a further embodiment the cover is made of a material comprising plastic, wherein the cover has an atomic layer deposition (ALD) coating on the outside and on the inside, particularly wherein the ALD coating on the outside and/or the inside is covered by a hard coating.

In a further embodiment the cover has an anti-reflex (AR) coating on the inside and/or on the outside, particularly wherein the cover has on the inside and/or on the outside an area, which is free of the AR coating. For example, the AR coating may be applied on a, particularly inside, circumferential band, which covers a limited elevation range.

In a further embodiment the cover has a hemispherical head part, wherein the hemispherical head part comprises a planar area with a planar surface both on the outside and the inside, particularly wherein the planar area is arranged at zenith.

In a further embodiment the planar area is specifically foreseen for mounting an additional sensor, particularly a global navigation satellite system (GNSS) transceiver, or wherein the planar area is specifically foreseen for providing a zenith LIDAR measurement by the laser scanner.

In a further embodiment the localization unit is configured to determine the trajectory with six degrees of freedom, namely involving position and orientation of the mobile reality capture device. In particular, the mobile reality capture device is configured for simultaneous localization and mapping (SLAM) to generate a three-dimensional map by involving at least one of data of the IMU, image data of the camera unit for visual simultaneous localization and mapping (VSLAM), and LIDAR data for LIDAR based simultaneous localization and mapping (LIDAR-SLAM).

In a further embodiment the laser scanner of the mobile reality capture device comprises a support, mounted on the base and being rotatable relative to the base, and a rotating body for deflecting the outgoing laser measurement beam and returning parts of the laser measurement beam, the rotating body being mounted on the support and being rotatable relative to the support. In this setup, the generation of the LIDAR data comprises a continuous rotation of the support relative to the base and a continuous rotation of the rotating body relative to the support, and emission of the laser measurement beam via the rotating body, which continuously rotates, and detection of parts of the laser measurement beam returning via the rotating body.

In particular, the laser scanner is configured that the continuous rotation of the rotating body relative to the support is faster than the continuous rotation of the support relative to the base. For example, the continuous rotation of the support is at least 1 Hz and the continuous rotation of the rotating body is at least 50 Hz, particularly wherein for at least one of the rotation of the rotating body and the rotation of the support two different rotation rates are settable.

A further aspect of the invention, taken separately or in combination with the other aspects of the invention, relates to a mobile reality capture device configured to be carried and moved by a mobile carrier and to be moved during a measuring process for generating a digital representation of an environment. The mobile reality capture device has a localization unit, particularly comprising an inertial measurement unit (IMU), the localization unit being configured for generating localization data for determining a trajectory of the mobile reality capture device. Furthermore, the device has a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud.

According to this aspect, the laser scanner comprises a deflection element for reflecting returning parts of the laser measurement beam, and the deflection element is configured to rotate about one of the two rotation axes and has a reflecting curved surface, e.g. of parabolic shape, functioning as collecting optics for the returning parts of the laser measurement beam.

In one embodiment, the deflection element is configured for deflecting the outgoing laser measurement beam and returning parts of the laser measurement beam, wherein the laser scanner comprises a base and a support, mounted on the base and being rotatable relative to the base, and the deflection element is mounted on the support and rotatable relative to the support. Here, the generation of the LIDAR data comprises a continuous rotation of the support relative to the base and a continuous rotation of the deflection element relative to the support, and emission of the laser measurement beam via the continuously rotating deflection element and detection of parts of the laser measurement beam returning via the deflection element.

In a further embodiment the laser scanner is free of a beam forming optics in the reception path between the deflection element and a receiver of the laser scanner.

In a further embodiment the reception path between the deflection element and a receiver of the laser scanner comprises a folding mirror, particularly arranged in the support, wherein the folding mirror is moveable for adjusting alignment of the optical axis of the reception path onto the receiver.

In a further embodiment the laser scanner has a receiver board, particularly arranged in the support, comprising a light sensitive detection surface of a receiver, wherein the receiver board is moveable for adjusting the alignment of the detection surface in two orthogonal directions lateral to the optical axis of the reception path.

A further aspect of the invention, taken separately or in combination with the other aspects of the invention, relates to a mobile reality capture device configured to be carried and moved by a mobile carrier and to be moved during a measuring process for generating a digital representation of an environment. The device has a localization unit, particularly comprising an inertial measurement unit (IMU), the localization unit being configured for generating localization data for determining a trajectory of the mobile reality capture device. Furthermore, the device comprises a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud.

The laser scanner further comprises a rotating body configured to rotate about one of the two rotation axes for variable deflection of the outgoing laser measurement beam and of returning parts of the laser measurement beam, wherein the rotating body has a reflecting surface for reflecting returning parts of the laser measurement beam towards a detector of the laser scanner.

According to this aspect of the invention, the rotating body has a passage area arranged in the reflecting surface and configured to allow radiation coming from the inside of the rotating body to pass, so that the outgoing laser measurement beam coming from the inside of the rotating body, namely from the side facing away from the reflecting surface, can be sent into the environment through the passage area.

In one embodiment the rotating body comprises a deflection component, particularly a prism or mirror, configured to co-rotate with the rotating body and to deflect the outgoing laser measurement beam coming from the inside of the rotating body. For example, the deflection component is embodied by a reflective prism penetrating the rotating body, particularly a polygon-shaped or round cylinder prism, more particularly a rectangular cylinder prism.

In a further embodiment the rotating body has a receptacle for the deflection component, wherein the receptacle is formed along the rotation axis of the rotating body, namely the one of the two rotation axes around which the rotating body is foreseen to rotate for the variable deflection of the outgoing laser measurement beam and of returning parts of the laser measurement beam. The receptacle is configured to provide coaxial alignment of the rotation axis of the rotating body with the optical transmission axis inside the rotating body, e.g. wherein the receptacle has a mirror axis, which is coaxial to the rotation axis of the rotating body.

In a further embodiment the receptacle has a first and a second contacting surface, wherein a recess is formed between the first and second contact surface and the first and second contact surface lie in a first stabilization plane having an extension along the rotation axis of the rotating body. Furthermore, the receptacle has a third contact surface, wherein the third contact surface lies in a second stabilization plane having an extension along the rotation axis of the rotating body. The first and second stabilization plane intersect, particularly at a right angle, wherein the first and the third contact surface adjoin one another and form a corner.

In a further embodiment the deflection component has a first and a second side, particularly planar sides adjoining each other, wherein the deflection component has a facet. The deflection component is further configured that it can be brought into the receptacle, such that the first side is in contact with the first and second contact surface of the receptacle, and the second side is in contact with the third contact surface of the receptacle, wherein the facet frees the corner. When built-in, a force is exerted on the deflection component, such that the forces on the first, the second, and the third contact surfaces are equal.

In a further embodiment the receptacle is configured to receive a round cylinder prism, for which it comprises a rounded pressing region and a countering mechanism, particularly comprising two screw holes, for turning and fixing a received prism.

In a further embodiment the laser scanner comprises a base and a support, wherein the support is mounted on the base and rotatable relative to the base, and the rotating body is mounted on the support and rotatable relative to the support, wherein the generation of the LIDAR data comprises a continuous rotation of the support relative to the base and a continuous rotation of the rotating body relative to the support, and emission of the laser measurement beam via the passage area of the rotating body and detection of parts of the laser measurement beam returning via the reflecting surface of the rotating body.

In particular, along the rotation axis of the rotating body, namely the one of the two rotation axes around which the rotating body is foreseen to rotate for the variable deflection of the outgoing laser measurement beam and of returning parts of the laser measurement beam, the support has two opposing support elements. The rotating body is arranged in the support such that a first of the two support elements is arranged on the side facing the reflecting surface and a second of the two support elements is arranged on the side facing away from the reflecting surface. Furthermore, the first support element has an entry embodied around the rotation axis of the rotating body, particularly comprising an optical window or a beam-forming optic. The rotating body is mounted on the second support element and is configured that the outgoing laser measurement beam coming from the inside of the rotating body and passing through the passage area is deflected away from the rotation axis of the rotating body, particularly in a direction perpendicular to the rotation axis of the rotating body, and radiation of the laser measurement beam returning along the pointing direction of the outgoing laser measurement beam is deflected by the reflecting surface towards the entry of the first support element.

A further aspect of the invention, taken separately or in combination with the other aspects of the invention, relates to a mobile reality capture device configured to be carried and moved by a mobile carrier and to be moved during a measuring process for generating a digital representation an environment. The device has a localization unit, particularly comprising an inertial measurement unit (IMU), the localization unit being configured for generating localization data for determining a trajectory of the mobile reality capture device.

Furthermore, the mobile reality capture device has a laser scanner configured to carry out, during movement of the mobile reality capture device, a scanning movement of a laser measurement beam, and, based thereof, to generate light detection and ranging (LIDAR) data for generating a three-dimensional point cloud, and a camera unit configured to capture image data along at least two different imaging directions relative to the mobile reality capture device.

According to this aspect of the invention, the mobile reality capture device has multiple light indicators, wherein the mobile reality capture device is configured to determine probing data based on at least one of the localization data, the LIDAR data, and the image data. Each of the light indicators is assigned to a scan section fixed relative to the mobile reality capture device, and each of the light indicators provides, particularly in essentially real-time, indication on a quality parameter for the probing data regarding its assigned scan section.

In one embodiment, the mobile reality capture device is configured to determine as quality parameter for each scan section a spatial resolution parameter provided by the assigned probing data, particularly a LIDAR point density or a LIDAR point distribution.

In a further embodiment the mobile reality capture device is configured to run a feature recognition algorithm on the probing data and, based thereof, to recognize semantic and/or geometric features in the probing data, wherein the indication on the quality parameter is based on recognized semantic and/or geometric features.

In a further embodiment the multiple light indicators are circumferentially arranged on a lateral surface of the mobile reality capture device, such that the arrangement of each of the light indicators on the lateral surface corresponds with its assigned scan section.

For example, the multiple light indicators are embodied by single lamps, particularly LEDs, or a light guide ring having multiple separately controllable segments.

In a further embodiment the mobile reality capture device is configured that the indication of the quality parameter at least comprises an indication that the quality parameter meets a defined quality criterion, particularly a threshold, and/or that the quality parameter fails to meet the defined quality criterion.

In a further embodiment the mobile reality capture device is configured that the indication of the quality parameter is provided by color coding and/or blink coding, particularly comprising a series of clearly separated single pulses and/or an intensity pulsation, namely a continuously fading and strengthening pulse signal.

In a further embodiment the mobile reality capture device is configured for carrying out a visual localization algorithm, for which it comprises a localization camera configured to generate image data. Furthermore, the mobile reality capture device is configured that activation of the multiple light indicators is coordinated with the image capture rate of the localization camera, particularly such that the multiple light indicators are only activated when the shutter of the localization camera is closed.

In a further embodiment the mobile reality capture device is configured that the multiple light indicators further provide a color coding and/or blink coding, particularly comprising a series of clearly separated single pulses and/or an intensity pulsation, namely a continuously fading and strengthening pulse signal.

For example, the color and/or blink coding indicates at least one of the following operating conditions of the mobile reality capture device: device ready, localization initialization on-going, localization initialization completed, localization re-initialization required, movement of device too fast and/or too slow, image taken by camera unit, battery low, and connection to a companion device lost.

A further aspect of the invention, taken separately or in combination with the other aspects of the invention, relates to a mobile reality capture device configured to be carried and moved by a mobile carrier and to be moved during a measuring process for generating a digital representation of an environment. The device has a localization unit, particularly comprising an inertial measurement unit (IMU), the localization unit being configured for generating localization data for determining a trajectory of the mobile reality capture device. Furthermore, the device has a probing unit, at least comprising a laser scanner configured to generate light detection and ranging (LIDAR) data, and particularly a camera, wherein the probing unit is configured to generate, during movement of the mobile reality capture device, probing data for determining a digital model of the environment.

In addition the mobile reality capture device has a guiding unit configured to provide guidance from a current location of the mobile reality capture device towards an area of the environment, and the mobile reality capture device is configured to determine probing data based on at least one of the localization data, and the LIDAR data.

According to this aspect of the invention, the mobile reality captured device is configured to generate guiding data, which provide the location of an area of the environment where additional probing data are required, based on an analysis of the probing data and/or a comparison with model data of the environment. Then the device is configured to activate the guiding unit for providing guidance from the current location of the mobile reality capture device to the area of the environment where additional probing data are required.

In one embodiment the area of the environment where additional probing data are required is determined by analyzing the probing data with respect to a defined quality criterion for determining areas with insufficient data quality.

In a further embodiment the quality criterion is based on a spatial resolution parameter, particularly a LIDAR point density or a LIDAR point distribution, and/or an intensity threshold parameter for the LIDAR data.

In a further embodiment the model data are based on previously acquired probing data and/or on a pre-defined environment model, particularly a building information model (BIM) in case the environment is a building. For example, the comparison with the model data provides at least an indication of areas where probing data are missing.

In a further embodiment the mobile reality capture device is configured to run a feature recognition algorithm on the probing data and, based thereof, to recognize semantic and/or geometric features in the probing data, and to generate the guiding data based on recognized semantic and/or geometric features.

In a further embodiment the probing unit is configured to involve image data as part of the probing data, wherein the quality criterion provides identification of an area with at least one of missing image data, image data with insufficient resolution, image data with insufficient image sharpness, image data with smeared images, image data with insufficient intensity, and image data with too high intensity, particularly saturated images.

In a further embodiment the guiding unit is configured to provide acoustic guiding signals for guiding an operator relative to an orientation of the mobile reality capture device.

In a further embodiment the guiding unit comprises multiple light indicators configured to provide visual guiding signals for guiding an operator relative to an orientation of the mobile reality capture device. For example, the multiple light indicators are circumferentially arranged on a lateral surface of the mobile reality capture device, such that the arrangement of each of the light indicators on the lateral surface corresponds to a movement direction to be indicated.

In a further embodiment the mobile reality capture device is configured to provide visual coding and/or acoustic coding, e.g. for providing at least one of: a desired turn speed, indication of an amount of turn angle, indication of a residual distance to the area of the environment where the probing data are insufficient, and a desired speed for moving the mobile reality capture device.

In a further embodiment the mobile reality capture device is configured to initialize generation of the guiding data based on user input.

In a further embodiment the mobile reality capture device is configured to automatically initialize generation of the guiding data based on a localization parameter indicating a position and/or movement direction of the mobile reality capture device, e.g. in combination with a feature parameter derived from the probing data, wherein the feature parameter indicates a position of an exit of a current measurement perimeter, particularly a door.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment.

The device has a localization unit, particularly comprising an inertial measurement unit (IMU), the localization unit being configured for generating localization data for determining a trajectory of the mobile reality capture device, a laser scanner configured to carry out, during movement of the mobile reality capture device, a scanning movement of a laser measurement beam, and, based thereof, to generate light detection and ranging (LIDAR) data for generating a three-dimensional point cloud, and a status indicator for visually indicating an operating condition of the mobile reality capture device.

According to this aspect of the invention, the status indicator is circumferentially arranged on a lateral surface of the mobile reality capture device, the lateral surface defining a standing axis of the mobile reality capture device, namely wherein the lateral surface is circumferentially arranged around the standing axis, and the status indicator is configured to appear identical for all viewing directions around the standing axis, namely that irrespective of a rotational position of the mobile reality capture device about the standing axis, the same information provided by the status indicator is visible when viewing the mobile reality capture device from within a plane perpendicular to the standing axis.

In one embodiment the localization unit is configured for carrying out a visual localization algorithm, for which it comprises a localization camera configured to generate image data, and the mobile reality capture device is configured that activation of the status indicator is coordinated with the image capture rate of the localization camera, particularly such that the status indicator is only radiating light when the shutter of the localization camera is closed.

In a further embodiment the status indicator is embodied by single lamps, particularly LEDs, which are circumferentially arranged around the standing axis, particularly wherein the single lamps lie in the same plane orthogonal to the standing axis.

In a further embodiment the status indicator is embodied as a light guide ring, which is circumferentially arranged around the standing axis.

In a further embodiment the status indicator is embodied by means of a fiber optic ring with at least one coupling of light, in particular several couplings, more particularly six couplings, wherein the status indicator is configured that with increasing distance from the coupling position along the fiber optic ring the ratio of radiation sent in the radial direction relative to the standing axis to the radiation sent along the fiber optic ring increases.

In a further embodiment the status indicator is configured to provide the operating condition of the mobile reality capture device by means of a color coding and/or blink coding, particularly comprising a series of clearly separated single pulses and/or an intensity pulsation, namely a continuously fading and strengthening pulse signal, more particularly wherein the coding is provided by means of a rotating coding running around the standing axis.

A further aspect of the invention, taken separately or in combination with the other aspects of the invention, relates to a laser scanner configured to generate light detection and ranging (LIDAR) data based on a laser measurement beam, wherein the laser scanner has a base, a support, mounted on the base and being rotatable relative to the base, and a rotating body for deflecting the outgoing laser measurement beam and returning parts of the laser measurement beam, the rotating body being mounted on the support and being rotatable relative to the support. The generation of the LIDAR data comprises a continuous rotation of the support relative to the base and a continuous rotation of the rotating body relative to the support, and emission of the laser measurement beam via the rotating body and detection of parts of the laser measurement beam returning via the rotating body.

According to this aspect of the invention, the laser scanner comprises a referencing element having a curved surface, wherein the referencing element is configured and arranged such that, caused by the continuous rotation of the rotating body relative to support, the outgoing laser measurement beam can generate a track on the curved surface. At different track positions along the track different incidence angles of the outgoing laser measurement beam with the curved surface are generated, which causes that different fractions of light are scattered back along the incident direction of the laser measurement beam as a function of the track position.

In one embodiment the curved surface is arched outwards, namely in the direction of the rotating body.

In a further embodiment the top of the curved surface is configured to have uniform reflecting properties along the track, particularly over the entire surface. Alternatively, the top of the curved surface is configured to have varying reflecting properties along the track, particularly wherein along at least a part of the track, the top is configured to have a transition from high reflectivity to low reflectivity.

In a further embodiment the referencing element is buried in a depression of the support, particularly wherein the lateral walls of the depression are configured to act as a radiation swamp.

In a further embodiment the referencing element is arranged relative to the rotating body in a direction towards the base, namely a nadir position.

In a further embodiment a motor for the rotation of the support relative to the base is arranged in the support, and the curved surface is formed by the motor cap of the motor.

In a further embodiment the referencing element is arranged relative to the rotating body in a direction facing away from the base, namely a zenith position.

In a further embodiment the laser scanner comprises a further referencing element, which is configured and arranged such that, caused by the continuous rotation of the rotating body relative to support, the outgoing laser measurement beam can generate a track on a surface of the further referencing element, and that at different track positions along the track different fractions of light are scattered back along the incident direction of the laser measurement beam as a function of the track position.

For example, the further referencing element is arranged relative to the rotating body in a direction towards the base, namely a nadir position, or the further referencing element is arranged in a direction facing away from the base, namely a zenith position.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a localization unit, particularly comprising an inertial measurement unit (IMU), the localization unit being configured for generating localization data for determining a trajectory of the mobile reality capture device.

According to this aspect of the invention, the mobile reality capture device comprises a laser scanner as described above, wherein the laser scanner is configured to generate the LIDAR data during movement of the mobile reality capture device.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment.

Here, the device has a localization unit comprising a localization camera, particularly a global shutter camera, and particularly an inertial measurement unit (IMU), the localization unit being configured for determining a trajectory of the mobile reality capture device by means of a localization algorithm involving localization image data generated by the localization camera.

Furthermore, the reality capture device has a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud, and a detail camera, which has higher resolution as the localization camera, particularly wherein the detail camera is a color camera.

According to this aspect of the invention, the mobile reality capture device is configured to continuously generate localization image data by the localization camera, and to generate detail image data by the detail camera, wherein the detail image data are generated with low rate compared to the acquisition rate of the localization camera for continuously generating the localization image data.

In one embodiment the localization unit comprises three, particularly global shutter, localization cameras, wherein the detail camera and the three localization cameras are circumferentially arranged on a lateral surface of the reality capture device, the lateral surface defining a standing axis of the mobile reality capture device, namely wherein the lateral surface is circumferentially arranged around the standing axis. Furthermore, two of the three localization cameras lie in separate orthogonal planes to the standing axis, and particularly have different angular orientations with respect to a rotation about the standing axis.

In particular, two of the three localization cameras and the detail camera lie in the same orthogonal plane to the standing axis, wherein the one of the three localization cameras which lies in a separate orthogonal plane to the standing axis has the same angular orientation as the detail camera. Therefore, the mobile reality capture device may be configured to run a stereo-photogrammetry algorithm on the image data taking into account the separation of the orthogonal planes.

In a further embodiment the localization unit comprises multiple localization cameras, particularly wherein the multiple localization cameras are configured and arranged that, for a nominal minimum operating range of the localization unit, each of the multiple localization cameras has a field of view overlap with at least another one of the multiple localization cameras.

In a further embodiment the mobile reality capture device is configured to generate from the localization image data and/or the detail image data a panoramic image, namely wherein individual images from different viewing directions are stitched together to form an image having a wider field of view than the individual images, e.g. wherein the mobile reality capture device is configured to generate a 360° panoramic image.

In a further embodiment the mobile reality capture device is configured that the generation of the detail image and/or the localization image data is triggered by at least one of a user command, a movement parameter, particularly indicating a standstill of the mobile reality capture device, a position along the trajectory of the mobile reality capture device and/or an orientation of the mobile reality capture device with respect to the trajectory, and a constant repetition rate.

In a further embodiment the field of view of the localization camera, or of each of the multiple localization cameras, is at least 90°×120°.

In a further embodiment the field of view of the detail camera is at least 80°×80°.

In a further embodiment the mobile reality capture device is configured to determine data for colorizing the three-dimensional point cloud represented by the LIDAR data, wherein at least part of the localization image data is processed for the purpose of including color information to the three-dimensional point cloud represented by the LIDAR data.

In a further embodiment the process for including color information to the three-dimensional point cloud is based on a selection algorithm configured to specifically determine and select an image area of an individual image of the localization image data to be used for the colorizing, namely wherein only a sub-image comprising image points to be matched to a point in the three-dimensional point cloud are used.

In a further embodiment the mobile reality capture device is configured to generate with a first rate, the localization image data to be involved in the localization algorithm, and with a second rate, the localization image data for colorizing the three-dimensional point represented by the LIDAR data, wherein the second rate is lower than the first rate.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud, a camera unit configured to generate image data comprising colored images for colorizing the three-dimensional point cloud represented by the LIDAR data, and a localization unit, particularly comprising an inertial measurement unit (IMU), the localization unit being configured for determining a trajectory of the mobile reality capture device by means of a localization algorithm involving image data generated by the camera unit.

According to this aspect of the invention, the camera unit is configured that first and second image data are generated at different rates by the same camera of the camera unit, the first image data are specifically foreseen to be used for colorizing the three-dimensional point cloud represented by the LIDAR data, and the second image data, generated with higher rate than the first image data, are specifically foreseen to be used by the localization algorithm.

In one embodiment the camera unit is configured to generate the second image data as monochrome image data.

In a further embodiment the camera unit is configured to generate the second image data by means of a sub-sampled readout mode of the camera, which provides an increased frame rate compared to a high-resolution readout mode.

In a further embodiment the mobile reality capture device is configured to determine data for colorizing the three-dimensional point cloud represented by the LIDAR data, wherein at least part of the first image data is processed for the colorizing, which includes a specific determination and selection of an image area of an individual image of the first image data to be used for the colorizing, namely wherein only a sub-image comprising image points to be matched to a point in the three-dimensional point cloud is used for the colorizing.

In a further embodiment the mobile reality capture device is configured to generate, by the same camera which is foreseen to generate the first and the second image data, third image data for a generation of a panoramic image, particularly wherein the mobile reality capture device is configured to generate the panoramic image, namely wherein individual images generated by the camera unit from different viewing directions are stitched together to form an image having a wider field of view than the individual images.

In a further embodiment at least two of the first, the second, and the third image data originate from the same acquisition process of the camera, wherein raw images are generated and the camera unit is configured to generate for the same acquisition process image data with different resolution by means of an image compression or sub-sampling algorithm running on the raw images, particularly executed on a field programmable gate array (FPGA) or a graphics processing unit (GPU).

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a camera unit configured to generate image data for a panoramic image, particularly wherein the camera unit is configured to generate the panoramic image, namely wherein individual images of the camera unit from different viewing directions are stitched together to form an image having a wider field of view than the individual images, a localization unit, particularly comprising an inertial measurement unit (IMU), the localization unit being configured for determining a trajectory of the mobile reality capture device by means of a localization algorithm involving image data generated by the camera unit, and a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud.

According to this aspect of the invention, the camera unit is configured that first and second image data are generated at different rates by the same camera of the camera unit, the first image data are specifically generated and stored for the generation of the panoramic image, wherein the camera adjusts the shutter speed for generating the first image data by allowing abrupt corrections within a first tolerance range, which essentially spans a nominal range of the camera, and the second image data, generated with higher rate than the first image data, are specifically foreseen to be used by the localization algorithm, wherein the camera adjusts the shutter speed for generating the second image data by only allowing gradual corrections within a second tolerance range, which is smaller than the first tolerance range and specifically tuned to a working range of the localization unit.

In one embodiment, the camera for generating the first and the second image data is a rolling shutter camera and the mobile reality capture device comprises a motion determination unit, particularly having an IMU, configured to determine a motion parameter indicative of a motion of the mobile reality capture device, and a compensation unit configured to generate the second image data by correcting initial images acquired for generating the second image data, wherein the initial images are corrected for motion blur due to the rolling shutter by taking into account the motion parameter.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment. The mobile reality capture device further has a housing enclosing an internal space, wherein the internal space has a first area free of rotating parts, and a second area, comprising rotating parts configured to provide a scanning movement of a laser measurement beam for generating light detection and ranging (LIDAR) data.

According to this aspect of the invention, the device has a cooling system having a fan unit, an air entrance to let in external air into the first area, and an air passage to forward air from the first area, namely the air that entered over the air entrance, into the second area.

In one embodiment, the cooling system comprises a two-stage filtering system, with a first filter, particularly at least a rainproof filter, which is arranged at the air entrance and separates the internal space from the ambiance, and a second filter, which is arranged in the internal space and separates the internal space in a dirty inner zone lying upstream of the second filter between the first filter and the second filter and a clean inner zone lying downstream of the second filter between the second filter and an air outlet for releasing air into the ambiance.

In a further embodiment the first filter has coarser filter fineness than the second filter.

In particular, the two-stage filtering system is of modular design, which provides modular removal of the first and/or the second filter, e.g. wherein the first and/or the second filter is configured to be water-washable and/or vacuum cleaner cleanable.

In a further embodiment the mobile reality capture device has a filter monitoring system configured to monitor a contamination level of the two-stage filtering system, particularly based on a determination of the air resistance of air flowing through the two-stage filtering system.

In a further embodiment the mobile reality capture device comprises a fan controlling unit, configured to control a fan used to generate the air flow of the external air into the first area, wherein the fan controlling unit is configured to prevent generation of the air flow based on a determined condition of the two-stage filtering system, particularly based on a threshold for a contamination level of at least one of the first and the second filter, and/or based on a detection that a filter of the two-stage filtering system is missing.

In a further embodiment the first and the second area comprise a stator or a rotor, respectively, configured to provide the air passage between the first and the second area, wherein both stator and rotor have ring segment slits between radial struts, which open ventilation openings between the first and the second area in at least some relative rotation positions of rotor and stator.

In a further embodiment the cooling system comprises an air outlet based on overpressure, particularly a one-way valve, and/or configured to protect the internal space from contamination by refluxing air from the outside by means of a filter unit, particularly wherein the filter unit comprises a filter of the same type as the first or second filter.

In a further embodiment the mobile reality capture device comprises means for separately guiding air from the first area into different areas of the internal space, e.g. for separately guiding air to the second area and to an area comprising cooling ribs of a computing processor of the mobile reality capture device.

In a further embodiment the second area comprises at least one of: a LIDAR sensor, deflection optics for deflecting the laser measurement beam, and a laser emitter for emitting the laser measurement beam.

In a further embodiment the mobile reality capture device has a localization unit, particularly comprising an inertial measurement unit (IMU), the localization unit being configured for generating localization data for determining a trajectory of the mobile reality capture device.

In a further embodiment the rotating parts are associated to a laser scanner, which is configured to carry out, during movement of the mobile reality capture device, the scanning movement of the laser measurement beam, which is a scanning movement relative to two rotation axes, and, based thereof, to generate the LIDAR data for generating a three-dimensional point cloud.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a housing enclosing an internal space, wherein the internal space comprises a rotating component, which is configured to rotate, and, based thereof, to provide a scanning movement of a laser measurement beam for generating light detection and ranging (LIDAR) data.

According to this aspect of the invention, the rotating component for providing the scanning movement of the laser measurement beam is further configured to provide generation of an airflow to drive an air cooling system of the mobile reality capture device, particularly wherein the rotating component is equipped with a rotor blade.

In one embodiment, the rotating component drives an internal air circulation, which is sealed from the ambience and comprises a cooling section for cooling air passing through.

In a further embodiment the mobile reality capture device has an air entrance and the cooling system is configured that the rotation of the rotating component causes a flow of external air entering via the air entrance.

In a further embodiment, the rotating component is equipped with a rotor blade, the rotating component is arranged in an area which has an air inlet of an air channel to supply air into the area, and an air outlet to remove air from the area, and the rotor blade is configured and arranged that caused by the rotation of the rotating component the rotor blade passes the inlet or the outlet, respectively, in order to generate a pressure gradient at the inlet or the outlet, respectively, which drives the air from the inlet to the outlet.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a simultaneous localization and mapping (SLAM) unit, particularly comprising an inertial measurement unit (IMU), the SLAM unit being configured to generate SLAM data and, based thereof, a three-dimensional map of the environment and a trajectory of the mobile reality capture device in the three-dimensional map. Furthermore, the reality capture device has a probing unit, at least comprising a laser scanner, and particularly a camera, wherein the probing unit is configured to generate, during movement of the mobile reality capture device, probing data of the environment.

According to this aspect of the invention, the mobile reality capture device has a data evaluation unit, configured to carry out an evaluation of a geometric relationship between an acquisition position of the mobile reality capture device within the three-dimensional map and an area in the three-dimensional map to be probed from the acquisition position, wherein the mobile reality capture device is configured to control the generation of the probing data by taking into account the evaluation of the geometric relationship.

In one embodiment the SLAM unit is configured to involve visual simultaneous localization and mapping (VSLAM) for generating the three-dimensional map, and/or the SLAM unit is configured to involve LIDAR based simultaneous localization and mapping (LIDAR-SLAM) for generating the three-dimensional map. For example, the mobile reality capture device is configured to select at least part of the SLAM data as probing data by taking into account the evaluation of the geometric relationship, more particularly wherein the mobile reality capture device is configured to delete at least part of the SLAM data which is not selected as probing data.

In a further embodiment the data evaluation unit is further configured to make a quality rating for the probing data as a function of the geometric relationship, the quality rating being based on at least one of: an expected spatial resolution of the probing data for the area in the three-dimensional map to be probed, an expected signal strength of a detected probing signal for generating probing data for the area in the three-dimensional map to be probed, an expected signal to noise of probing data for the area in the three-dimensional map to be probed, an expected angle of incidence of a probing radiation on a surface of the area in the three-dimensional map to be probed for generating probing data, and a comparison of a focal distance and the expected distance between the mobile reality capture device and the area in the three-dimensional map to be probed.

In a further embodiment the data evaluation unit is configured to make a quality rating of the SLAM data underlying the three-dimensional map, wherein the mobile reality capture device is configured to control the generation of the probing data by taking into account a comparison of the quality rating for the SLAM data and the quality rating for the probing data for the same area in the three-dimensional map.

In a further embodiment the mobile reality capture device is configured to carry out, particularly in real time, a comparison between acquired probing data associated to multiple acquisitions of the area of the three-dimensional map to be probed by taking into account the evaluation of the geometric relationship associated to the acquisition positions of the multiple acquisitions, and to delete at least part of the acquired probing data based on the comparison.

In a further embodiment the mobile reality capture device is configured to select and/or adaptively control a data acquisition mode of the probing unit for generating the probing data by taking into account the evaluation of the geometric relationship.

In a further embodiment the probing unit comprises a laser scanner configured to carry out, during movement of the mobile reality capture device, a scanning movement of a laser measurement beam, and, based thereof, to generate light detection and ranging (LIDAR) data for generating a three-dimensional point cloud, and the mobile reality capture device is configured to select and/or adaptively control at least one of: a point repetition rate of the laser scanner, and a movement parameter of the scanning movement, particularly a rotation speed of the laser measurement beam relative to one and/or two rotation axes.

In a further embodiment the probing unit comprises a detail camera, particularly wherein the SLAM unit is configured for including VSLAM and the detail camera has higher resolution than a VSLAM camera of the SLAM unit, and the mobile reality capture device is configured to select and/or adaptively control at least one of: a shutter speed of the detail camera, an exposure time of the detail camera, and an exposure rate of the detail camera.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a simultaneous localization and mapping (SLAM) unit, particularly comprising an inertial measurement unit (IMU), the SLAM unit being configured to generate SLAM data and, based thereof, a three-dimensional map of the environment and a trajectory of the mobile reality capture device in the three-dimensional map, a probing unit, at least comprising a laser scanner, and particularly a camera, wherein the probing unit is configured to generate, during movement of the mobile reality capture device, probing data of the environment.

According to this aspect of the invention, the mobile reality capture device further has a data evaluation unit, configured to make a quality rating of the SLAM data underlying the three-dimensional map, wherein the mobile reality capture device is configured to control the generation of the probing data by taking into account the quality rating of the SLAM data.

In one embodiment the quality rating of the SLAM data is based on at least one of: a spatial resolution provided by the SLAM data for an area in the three-dimensional map, an intensity level provided by the SLAM data for an area in the three-dimensional map, a signal to noise provided by the SLAM data for an area in the three-dimensional map, a geometric relationship between an acquisition position of the mobile reality capture device for generating the SLAM data and an area in the three-dimensional map captured by the SLAM data, and a comparison of a focal distance of a visual SLAM (VSLAM) camera and the distance between the mobile reality capture device and an area in the three-dimensional map captured by the VSLAM camera.

In a further embodiment the mobile reality capture device is configured to delete probing data for an area in the three-dimensional map captured by the probing unit based on the quality rating of the SLAM data.

In a further embodiment the mobile reality capture device is configured to select and/or adaptively control a data acquisition mode of the probing unit for generating the probing data by taking into account the quality rating of the SLAM data.

In a further embodiment the mobile reality capture device is configured to activate the generation of the probing data by user input.

In a further embodiment the probing unit comprises a detail camera, particularly wherein the SLAM unit is configured for including VSLAM and the detail camera has higher resolution than a VSLAM camera of the SLAM unit. The probing unit has a burst mode, which can be activated by the user input, and in the burst mode, the detail camera continuously generates image data for a photogrammetry algorithm, e.g. wherein the duration of the burst mode is controllable by the user input.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a probing unit, at least comprising a laser scanner, and particularly a camera, wherein the probing unit is configured to generate, during movement of the mobile reality capture device, probing data of the environment for generating a three-dimensional point cloud, and a localization unit, particularly comprising an inertial measurement unit (IMU), the localization unit being configured for generating localization data for determining a trajectory of the mobile reality capture device.

According to this aspect of the invention, the reality capture device has an edge computing functionality configured to generate, based on the probing data, a three-dimensional vector file model of the environment, particularly a mesh, and a, particularly wireless, data interface configured to provide a data stream comprising probing data and the three-dimensional vector file model to a separate receiving device, wherein the mobile reality capture device is configured to generate and provide the data stream based on a prioritization algorithm configured to favor streaming of data of the three-dimensional vector file model over streaming of probing data.

In one embodiment, the mobile reality capture device is configured to delete at least part of the probing data, particularly based on recognized semantic and/or geometric features.

In a further embodiment the mobile reality capture device is configured to flag at least part of the probing data as redundant in view of the three-dimensional vector file model, particularly probing data associated to a surface in the three-dimensional vector file model.

In a further embodiment the mobile reality capture device is configured to omit the probing data flagged as redundant when generating the data stream.

In a further embodiment the mobile reality capture device is configured to make a quality rating of acquired probing data based on the three-dimensional vector file model, and to control the generation of the probing data by taking into account the quality rating of the probing data.

In a further embodiment the mobile reality capture device is configured to control the generation of the probing data by carrying out an evaluation of a geometric relationship between an acquisition position of the mobile reality capture device within the three-dimensional vector file model and an area in the three-dimensional vector file model to be probed from the acquisition position. For example, the mobile reality capture device is further configured to make a quality rating for the probing data as a function of the geometric relationship.

In a further embodiment the quality rating of the acquired probing data or the quality rating for the probing data as a function of the geometric relationship, respectively, is based on at least one of: a spatial resolution provided by the probing data, a signal strength of a probing signal for generating the probing data, a signal to noise provided by the probing data, an angle of incidence of a probing radiation on a surface represented by a surface of the three-dimensional vector file model, and a comparison of a focal distance and the distance between the mobile reality capture device and a point within the three-dimensional vector file model.

In a further embodiment the three-dimensional vector file model is a mesh of fixed mesh-size, e.g. wherein the mobile reality capture device is configured that a user can set the mesh-size.

In a further embodiment the three-dimensional vector file model is a mesh having variable mesh-size, e.g. wherein the mesh-size is automatically adapted for a representation recognized semantic and/or geometric features, or based on the quality rating of the acquired probing data.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a simultaneous localization and mapping (SLAM) unit, particularly comprising an inertial measurement unit (IMU), the SLAM unit being configured to generate SLAM data and, based thereof, a three-dimensional map of the environment and a trajectory of the mobile reality capture device in the three-dimensional map, wherein the three-dimensional map is generated by identifying multiple features in the environment which allow a mutual linkage of the SLAM data.

According to this aspect of the invention, the mobile reality capture device comprises a feature tracker, configured to determine, at different positions of the mobile reality capture device along the trajectory, position data for a subset of the multiple features. For each of the different positions of the mobile reality capture device along the trajectory the corresponding position data provide a relative positional relationship between the subset of features relative to the corresponding position of the mobile reality capture device along the trajectory. Furthermore, the mobile reality capture device is configured to re-initialize the SLAM unit for continuing the generation of the three-dimensional map by recalling at least part of the position data.

In one embodiment, the mobile reality capture device is configured to re-initialize the SLAM unit by recalling the position data which has been determined for a last, particularly the most recent, position of the mobile reality capture device along the trajectory, or a series of position data corresponding to the most recent positions of the mobile reality capture device along the trajectory.

In a further embodiment the mobile reality capture device has an edge computing functionality configured to determine a current location of the mobile reality capture device by means of a comparison of a three-dimensional model based on current SLAM data with a three-dimensional model based on previous SLAM data, wherein the mobile reality capture device is configured to select the position data to re-initialize the SLAM unit based on the determined current location. For example, the mobile reality capture device is configured to generate, based on the SLAM data, a three-dimensional model of the environment, particularly a vector file model, and to run a feature recognition algorithm on the three-dimensional model and, based thereof, to recognize semantic and/or geometric features. In addition, the mobile reality capture device is configured to assign at least part of the recognized semantic and/or geometric features to position data of different positions of the mobile reality capture device along the trajectory, and to determine a current position along the trajectory based on the recognized semantic and/or geometric features.

In a further embodiment the mobile reality capture device has a guiding unit configured to provide guidance from a current location of the mobile reality capture device towards a desired location. Here, the mobile reality capture device is configured: to determine a current position within the three-dimensional map or within a three-dimensional model generated by the SLAM data, particularly based on recognized semantic and/or geometric features, to provide, by means of the guiding unit, guidance from the current position to a target position on the trajectory for which position data were determined, and to re-initialize the SLAM unit based on the position data, which were determined for the target position.

In a further embodiment the mobile reality capture device is configured to have a built-in position determining unit for generating localization data or to receive localization data from an external position determining unit, wherein the position determining unit is based on at least one of: triangulation by means of wireless signals, particularly wireless LAN signals, radio frequency positioning, and a global navigation satellite system (GNSS). Furthermore, the mobile reality capture device is configured to select the position data to re-initialize the SLAM unit based on the localization data of the position determining unit, or to provide, by means of the guiding unit, guidance from a current position provided by the localization data to a target position on the trajectory for which position data were determined.

A further aspect of the invention, taken separately or in combination with the other aspects of the invention, relates to a laser scanner configured to generate light detection and ranging (LIDAR) data based a scanning movement of a laser measurement beam relative to two rotation axes. The laser scanner has a cover, particularly a cover which is opaque for visible light, encasing moving parts of the laser scanner, such that during the scanning movement the laser measurement beam passes the cover at different penetration points, an angle determining unit configured to provide angle determination data for determining the orientation of an emission axis of the laser measurement beam relative to the two rotation axes, and a data memory, having stored spline based correction parameters to correct the angle determination data for offsets caused by the cover.

In one embodiment, the laser scanner is configured to correct the angle determining data, particularly in real time, by the offset provided by the correction parameters.

In a further embodiment the correction parameters are stored as a look up table or in the form of a correction matrix.

In a further embodiment the surface of the cover has a kink, wherein during the scanning movement the laser measurement beam passes the kink.

In a further embodiment the cover has a hemispherical head part, which merges in a cylindrical shell, e.g. wherein the laser scanner is configured that the LIDAR data are generated based on an orientation of the laser measurement beam where it passes through the hemispherical head part and an orientation of the laser measurement beam where it passes through the cylindrical shell.

A further aspect of the invention, taken separately or in combination with the other aspects of the invention, relates to a system, with a mobile reality capture device configured to be carried and moved by a mobile carrier, particularly a person or a robot or a vehicle, and to be moved during a measuring process for generating a digital representation of an environment. The mobile reality capture device has a localization unit, particularly comprising an inertial measurement unit (IMU), the localization unit being configured for generating localization data for determining a trajectory of the mobile reality capture device, a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud, and a camera configured to capture image data.

Furthermore, the system comprises a companion device, particularly embodied as smartphone, tablet, or personal computer, wherein the mobile reality capture device and the companion device are configured for server-client communication. The system is configured that access data for the server-client communication, particularly a service set identifier (SSID) and a password for the server, is encoded into a matrix barcode, particularly a QR code. The mobile reality capture device and/or the companion device is configured to capture an image of the matrix barcode and to decode the matrix barcode from the image in order to establish the server-client communication.

In one embodiment, the mobile reality capture device is configured to act as server for the server-client communication and the system comprises a tag displaying the matrix barcode, particularly wherein the tag is attached to or an integral part of the mobile reality capture device.

In a further embodiment the companion device is configured to display the matrix barcode on a display, wherein the mobile reality capture device is configured to, particularly automatically, recognize acquisition of an image comprising the matrix barcode, the image being captured by the camera, decode the matrix barcode from the image, and establish the server-client communication upon decoding the matrix barcode.

For example, the companion device is configured to act as server for the server-client communication, or to recognize access data for an available communication network and to encode the access data for the available communication network into the matrix barcode.

In a further embodiment the mobile reality capture device comprises a localization camera to be used by the localization unit, which is configured to generate the localization data, and particularly mapping data for generating a three-dimensional map, by involving camera images of the localization camera. The mobile reality capture device further comprises a detail camera, which has higher resolution as the localization camera, and the mobile reality capture device is configured to capture the image of the matrix barcode by means of the detail camera. For example, the mobile reality capture device may be configured that the image of the matrix barcode can be captured by manual trigger by a user.

A further aspect of the invention, taken separately or in combination with the other aspects of the invention, relates to a computer program product comprising program code, which is stored on a machine-readable medium or embodied by an electromagnetic wave comprising a program code segment, and which has computer-executable instructions for performing, particularly when run on a companion device of mobile reality capture device according to one of the preceding claims, at least:

- reading input data from a data base comprising localization data for determining a trajectory of a mobile reality capture device, light detection and ranging (LIDAR) data of a laser scanner of the mobile reality capture device, wherein the LIDAR data have been generated during movement of the mobile reality capture device along the trajectory and are based on a scanning movement of a laser measurement beam relative to two rotation axes, and image data of a camera unit arranged on a lateral surface of the mobile reality capture device, the lateral surface defining a standing axis of the mobile reality capture device, namely wherein the lateral surface is circumferentially arranged around the standing axis, wherein the image data have been generated during movement of the mobile reality capture device along the trajectory, particularly wherein the camera unit provides for image data which cover a visual field of at least 120° around the standing axis, particularly at least 180°, more particularly 360°,
- generating a three-dimensional model of the environment based on the input data, particularly a three-dimensional point cloud or a three-dimensional vector file model,
- generating a linkage of the image data with the three-dimensional model, such that individual images of the image data are relatable to their capture position within the three-dimensional model,
- providing a thumbnail representation, wherein at least part of the individual images of the image data is represented as thumbnails,
- receiving a selection of one of the thumbnails, and
- providing a, particularly three-dimensional, representation of the three-dimensional model with an indication of the capture position of the individual image associated with the selected thumbnail within the three-dimensional model.

In one embodiment, the representation of the three-dimensional model comprises at least part of the trajectory, particularly the part of the trajectory up to the trajectory position associated with the selected thumbnail.

In a further embodiment, the thumbnail representation is based on a population of thumbnails in a two-dimensional or three-dimensional grid.

A further aspect of the invention, taken separately or in combination with the other aspects of the invention, relates to a monitoring device for detecting an object within an infrastructure, particularly a building or facility, more particularly an area that is frequently exposed to people and/or vehicles passing through.

The monitoring device comprises a laser scanner configured to carry out a scanning movement of a laser measurement beam relative to two rotation axes, and, based thereof, to generate light detection and ranging (LIDAR) data for generating a three-dimensional point cloud of the infrastructure. Furthermore, the monitoring device has a camera unit configured to capture image data along at least two different imaging directions relative to the monitoring device, and an object detector configured to detect an object within the monitored infrastructure based on at least one of the LIDAR data and the image data.

According to this aspect of the invention, the monitoring device is configured to automatically switch from a low frequency capture mode to a high frequency capture mode upon detection of an object by the object detector, wherein compared to the low frequency capture mode at least one of the following parameters is increased in the high frequency capture mode: a point repetition rate of the laser scanner, a rotation speed of the laser measurement beam relative to at least one of the two rotation axes, and an exposure rate of a camera of the camera unit.

In one embodiment, the monitoring device comprises a base supporting the laser scanner, and a cover, particularly a cover which is opaque for visible light, mounted on the base such that the cover and the base encase all moving parts of the laser scanner, such that from the outside no moving parts are touchable.

In a further embodiment the monitoring device is configured to generate a three-dimensional model of the infrastructure by taking into account the LIDAR data, particularly a three-dimensional point cloud and/or a three-dimensional vector file model, and/or to generate from the image data a panoramic image, namely wherein individual images of different viewing directions of the camera unit are stitched together to form an image having a wider field of view than the individual images, particularly wherein the mobile reality capture device is configured to generate a 360° panoramic image.

In a further embodiment the monitoring device is configured to generate a data stream and to provide the data stream to a separate receiving device by means of a, particularly wireless and/or wired, data interface. For example, the data stream comprises at least one of LIDAR data, image data, model data of the three-dimensional model, and image data of a panoramic image.

A further aspect of the invention, taken separately or in combination with the other aspects of the invention, relates to a monitoring device for detecting an object within an infrastructure, particularly a building or facility, more particularly an area that is frequently exposed to people and/or vehicles passing through, comprising a laser scanner configured to carry out a scanning movement of a laser measurement beam relative to two rotation axes, and, based thereof, to generate light detection and ranging (LIDAR) data for generating a three-dimensional point cloud of the infrastructure, a camera unit configured to capture image data along at least two different imaging directions relative to the monitoring device, and an object detector configured to detect an object within the monitored infrastructure based on at least one of the LIDAR data and the image data.

According to this aspect of the invention, the monitoring device is configured to generate a data stream and to provide the data stream comprising the LIDAR data and the image data to a separate receiving device by means of a, particularly wireless and/or wired, data interface, and to automatically switch from a low data mode to a high data mode upon detection of an object by the object detector, wherein compared to the low data mode the amount of data in the data stream is increased in the high data mode.

A further aspect of the invention, taken separately or in combination with the other aspects of the invention, relates to a monitoring device for detecting an object within an infrastructure, particularly a building or facility, more particularly an area that is frequently exposed to people and/or vehicles passing through, comprising a laser scanner configured to carry out a scanning movement of a laser measurement beam relative to two rotation axes, and, based thereof, to generate light detection and ranging (LIDAR) data for generating a three-dimensional point cloud of the infrastructure, a camera unit configured to capture image data along at least two different imaging directions relative to the monitoring device, and an object detector configured to detect an object within the monitored infrastructure based on at least one of the LIDAR data and the image data.

According to this aspect of the invention, the monitoring device is configured to generate a three-dimensional model of the infrastructure by taking into account the LIDAR data, particularly a three-dimensional point cloud and/or a three-dimensional vector file model. The object detector is configured to detect the object based on the three-dimensional model, particularly wherein the object detector is configured to run a feature recognition algorithm on the three-dimensional model and, based thereof, to recognize semantic and/or geometric features.

In general, the camera unit of any one of the monitoring devices described above may comprise at least one of a visual imaging camera and a thermal imaging camera.

In particular, the camera unit comprises two visual imaging cameras having different viewing directions from each other, wherein each of the two visual imaging cameras has a field of view of at least 180 degrees, and the two visual cameras are circumferentially arranged around the laser scanner. For example, the two visual imaging cameras are arranged on an outer annulus encircling the laser scanner and defining a central ring axis, wherein the angular separation of the two visual imaging cameras with respect to a rotation about the central ring axis is 150 to 180 degrees.

The camera unit may also comprise four thermal imaging cameras having different viewing directions from each other, wherein each of the four thermal imaging cameras has a field of view of at least 80 degrees, and the four thermal imaging cameras are circumferentially arranged around the laser scanner. For example, the four thermal imaging cameras are arranged on an outer annulus encircling the laser scanner and defining a central ring axis, wherein the four thermal imaging cameras are separated by each other having uniform angular separation with respect to a rotation about the central ring axis.

A further aspect of the invention, taken separately or in combination with the other aspects of the invention, relates to a monitoring device for detecting an object within an infrastructure, particularly a building or facility, more particularly an area that is frequently exposed to people and/or vehicles passing through, comprising a laser scanner configured to carry out a scanning movement of a laser measurement beam relative to two rotation axes, and, based thereof, to generate light detection and ranging (LIDAR) data for generating a three-dimensional point cloud of the infrastructure, two visual imaging cameras having different viewing directions from each other, wherein each of the two visual imaging cameras has a field of view of at least 180 degrees, and the two visual cameras are circumferentially arranged around the laser scanner, four thermal imaging cameras having different viewing directions from each other, wherein each of the four thermal imaging cameras has a field of view of at least 80 degrees, and the four thermal imaging cameras are circumferentially arranged around the laser scanner, and a, particularly wireless and/or wired, data interface configured to provide a data stream comprising LIDAR data and image data of the visual and thermal imaging cameras to a separate receiving device.

In one embodiment, the monitoring device comprises a high dynamic range (HDR) camera, particularly a single exposure HDR camera, and/or a multispectral camera, particularly a hyperspectral camera, and/or a 3D camera.

A 3D camera is configured for range imaging, which is the name for a collection of techniques that are used to produce a 2D image showing the distance to points in a scene from a specific point, normally associated with some type of sensor device. The resulting image, the range image, has pixel values that correspond to the distance. If the sensor that is used to produce the range image is properly calibrated the pixel values can be given directly in physical units, such as meter.

In particular, the laser scanner may be replaced by the 3D camera.

In a further embodiment the two visual imaging cameras are arranged on an outer annulus encircling the laser scanner and defining a central ring axis, wherein the angular separation of the two visual imaging cameras with respect to a rotation about the central ring axis is 150 to 180 degrees.

In a further embodiment the four thermal imaging cameras are arranged on an outer annulus encircling the laser scanner and defining a central ring axis, wherein the four thermal imaging cameras are separated by each other having uniform angular separation with respect to a rotation about the central ring axis.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a localization unit, particularly comprising an inertial measurement unit (IMU), the localization unit being configured for generating localization data for determining a trajectory of the mobile reality capture device, and a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud.

According to this aspect of the invention, the mobile reality capture device has a receptacle having a depression for receiving, along a penetration axis, a pin of an additional component to the mobile reality capture device. Furthermore, the device has a locking mechanism, wherein the locking mechanism is configured to push, in a locking position being its basic position, a locking body radially inwards towards the penetration axis in order to engage in a cavity of the pin, and to enable the locking body to radially escape by pushing a contact element in a direction along the penetration axis, which allows the pin to be released.

In one embodiment, the locking mechanism comprises at least three locking bodies.

For example, the locking body is configured as a rotation body, in particular as a sphere or an ellipsoid, a trapezoid, a pyramid, a trapezoid having rounded corners, or a pyramid having rounded corners.

In a further embodiment the depression has the form of a solid of revolution formed around the penetration axis and the contact element is arranged on a circumference about the penetration axis.

In a further embodiment the locking mechanism comprises a sliding element configured to be axially movable along the penetration axis, wherein pushing or pulling the sliding element in a locking direction parallel to the penetration axis minimizes the radial movement range of the locking body, such that the locking body is pushed radially inwards towards the penetration axis. Furthermore, the locking mechanism is configured that upon pushing the contact element in a direction along the penetrating axis, the sliding element moves in a release direction opposite the locking direction, which releases space due to its displacement and thus enables the locking body to radially escape.

In a further embodiment the sliding element has a contact surface which in the locking position is in contact with the locking body, such that the locking body is pressed between the contact surface of the sliding element and a contact surface of the contact element, wherein the locking mechanism is configured that upon pushing the contact element in a direction along the penetration axis the locking body and the contact element are pushed in that same direction until the locking body can radially escape.

In a further embodiment the locking mechanism comprises a prestressing element, particularly a prestressing spring, to maintain the basic position, namely the position of the sliding element in the locking position.

Furthermore, the invention relates to a connector for connecting an additional component to a mobile reality capture device having a locking mechanism as described above. The connector has a pin configured to be inserted in the receptacle, wherein the pin has a circumferentially continuous cavity around a pin axis, the pin axis being foreseen to be parallel or coaxial to the penetration axis in the locking position, and wherein the cavity is specifically foreseen to receive the locking body of the locking mechanism. Furthermore, the connector has a release mechanism configured to push, in the locking position, the contact element in the direction along the penetration axis, namely along the pin axis.

In one embodiment, the release mechanism has a push element for pushing the contact element along the penetration axis, wherein the push element is configured to be axially movable relative to the pin along the pin axis, wherein the axial movement range of the push element relative to the pin allows to cause sufficient displacement of the contact element to let the locking body radially escape from the cavity.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a localization unit, particularly comprising an inertial measurement unit (IMU), the localization unit being configured for generating localization data and, based thereof, for determining a trajectory of the mobile reality capture device, and a probing unit, at least comprising a laser scanner configured to generate light detection and ranging (LIDAR) data, and particularly a camera, wherein the probing unit is configured to generate, during movement of the mobile reality capture device, probing data for determining a digital model of the environment.

According to this aspect of the invention, the mobile reality capture device is configured to set a data acquisition mode for generating the probing data as a function of a movement parameter of the mobile reality capture device.

In one embodiment, the mobile reality capture device is configured that the setting of the data acquisition mode involves changing a data acquisition rate for generating the probing data and/or changing a spatial resolution setting represented by probing data.

In a further embodiment the mobile reality capture device is configured to increase a data acquisition rate for generating the probing data with an increasing velocity of the mobile reality capture device along the trajectory.

In a further embodiment the mobile reality capture device is configured to set the data acquisition mode as a function of a change in the trajectory, namely as a function of the gradient of the trajectory.

In a further embodiment the mobile reality capture device is configured to set the data acquisition mode as a function of a velocity threshold of the mobile reality capture device along the trajectory. For example, the mobile reality capture device has a standstill acquisition mode, e.g. for providing maximal data quality on the expense of maximized data volume, wherein the standstill acquisition mode is automatically activated when the velocity of the mobile reality capture device falls below the velocity threshold.

In a further embodiment the laser scanner is configured to carry out, during movement of the mobile reality capture device, a scanning movement of a laser measurement beam, and, based thereof, to generate the LIDAR data, and the mobile reality capture device is configured to set the data acquisition mode by selecting and/or adaptively controlling at least one of: a point repetition rate of the laser scanner, and a movement parameter of the scanning movement, particularly a rotation speed of the laser measurement beam relative to one and/or two rotation axes.

In a further embodiment the probing unit comprises a camera and the mobile reality capture device is configured to set the data acquisition mode by selecting and/or adaptively controlling at least one of: a shutter speed of the camera, an exposure time of the camera, and an exposure rate of the camera.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a localization unit, particularly comprising an inertial measurement unit (IMU), the localization unit being configured for generating localization data and, based thereof, for determining a trajectory of the mobile reality capture device, a probing unit, at least comprising a laser scanner configured to generate light detection and ranging (LIDAR) data, and particularly a camera, wherein the probing unit is configured to generate, during movement of the mobile reality capture device, probing data for determining a digital model of the environment.

According to this aspect of the invention, the mobile reality capture device comprises a radio signal module, particularly a wireless local area network (WLAN) module, configured to measure a signal strength of a radio signal, wherein the mobile reality capture device is configured to determine a signal strength of a radio signal, which is available along the trajectory of the mobile reality capture device, and to provide a data set comprising a series of determined signal strengths of the radio signal, wherein each signal strength is associated to a position of the mobile reality capture device along the trajectory.

In one embodiment, the mobile reality capture device is configured to analyze the data set and, based thereof, to generate a signal reception map of the environment, proving a classification of the environment into different radio signal reception areas, wherein a signal strength value, particularly a mean or median value, is associated to each of the reception areas.

In a further embodiment the mobile reality capture device is configured to analyze the data set by means of a triangulation algorithm and, based thereof, to generate a map comprising positions of radio signal transmitters within the environment.

A further aspect of the invention, taken separately or in combination with the other aspects of the invention, relates to a computer program product comprising program code, which is stored on a machine-readable medium or embodied by an electromagnetic wave comprising a program code segment, and which has computer-executable instructions for performing, particularly when run on a companion device of mobile reality capture device according to one of the preceding claims, at least the steps of:

- reading input data from a data base comprising localization data for determining a trajectory of a mobile reality capture device, light detection and ranging (LIDAR) data of a laser scanner of the mobile reality capture device, wherein the LIDAR data have been generated during movement of the mobile reality capture device along the trajectory and are based on a scanning movement of a laser measurement beam relative to two rotation axes, and image data of a camera unit arranged on a lateral surface of the mobile reality capture device, the lateral surface defining a standing axis of the mobile reality capture device, namely wherein the lateral surface is circumferentially arranged around the standing axis, wherein the image data have been generated during movement of the mobile reality capture device along the trajectory, particularly wherein the camera unit provides for image data which cover a visual field of at least 120° around the standing axis, particularly at least 180°, more particularly 360°,
- generating panoramic image data, proving panoramic images along the trajectory such that continuously along the trajectory there is a panorama image, the panorama image being an image wherein individual images of different viewing directions of the camera unit are stitched together to form an image having a wider field of view than the individual images, particularly wherein the panorama image provides a 360° field of view around the standing axis, and
- providing a changeable display of the panoramic image data, wherein movement along the trajectory is possible upon which the panoramic images are continuously changed during the movement.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a localization unit, particularly comprising an inertial measurement unit (IMU), the localization unit being configured for generating localization data for determining a trajectory of the mobile reality capture device, a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud, and a camera unit arranged on a lateral surface of the mobile reality capture device, the lateral surface defining a standing axis of the mobile reality capture device, namely wherein the lateral surface is circumferentially arranged around the standing axis, wherein the camera unit is configured to provide for image data which cover a visual field of more than 180° around the standing axis, particularly 360°.

In one embodiment, the camera unit comprises multiple cameras circumferentially arranged on the lateral surface and the mobile reality capture device is configured to generate from the image data a panoramic image, namely wherein individual images of the multiple cameras are stitched together to form an image having a wider field of view than the individual images.

In a further embodiment the mobile reality capture device is configured for simultaneous localization and mapping (SLAM) to generate a three-dimensional map of the environment by involving at least one of: data of the IMU (IMU-SLAM), image data of the camera unit for visual simultaneous localization and mapping (VSLAM), and LIDAR data for LIDAR based simultaneous localization and mapping (LIDAR-SLAM).

In a further embodiment the mobile reality capture device is configured to generate a colorized three-dimensional point cloud based on the LIDAR data and image data of the camera unit.

In a further embodiment the mobile reality capture device is configured to generate a three-dimensional vector file model of the environment, particularly a mesh.

In a further embodiment the mobile reality capture device is configured for adaptively setting at least one of: the generating of the LIDAR data, by adaptively setting at least two different rotation rates for at least one of the two rotation axes and/or by adaptively setting at least two different point acquisition rates, a generating of image data to be used for a panoramic image, particularly image data provided by a camera of the camera unit, a generating of image data to be used for determining a trajectory of the mobile reality capture device, and a generating of image data to be used for colorizing the three-dimensional point cloud, particularly image data provided by a camera of the camera unit.

In a further embodiment the mobile reality capture device comprises an attachment unit for attaching an accessory device to the mobile reality capture device. The attachment unit has a fixing unit with a receptacle, configured to receive a counterpart to the receptacle and to secure the counterpart in the receptacle, particularly in a way which maintains a, particularly predetermined, orientation of the counterpart relative to the receptacle, and a wireless data bus, configured to provide for one or bi-directional data transfer between the accessory device and the mobile reality capture device.

For example, the fixing unit comprises at least one of: a magnet, a part of a hook and loop fastener, a female or male part of a plug-in connection, and a clamp.

In a further embodiment the attachment unit has an inductive power exchange unit, configured to provide power supply from the mobile reality capture device to an accessory device, which is secured by the fixing unit, and/or from the secured accessory device to the mobile reality capture device.

In a further embodiment the mobile reality capture device comprises a sensing unit, configured: to detect an accessory device within reach for wireless data transfer by the wireless data bus, and to activate the wireless data bus for starting the data transfer upon detection of the accessory device within reach, and/or to detect that an accessory device is secured by the fixing unit, and to activate the inductive power exchange unit for starting the power exchange upon detection of the secured accessory device.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a probing unit, at least comprising a laser scanner configured to generate light detection and ranging (LIDAR) data, and particularly a camera, wherein the probing unit is configured to generate, during movement of the mobile reality capture device, probing data for determining a three-dimensional model of the environment, a simultaneous localization and mapping (SLAM) unit, particularly comprising an inertial measurement unit (IMU), the SLAM unit being configured to access the probing data and, based thereof, to generate a three-dimensional map of the environment and a trajectory of the mobile reality capture device in the three-dimensional map, and a guiding unit configured to provide guidance from a current location of the mobile reality capture device towards an area of the environment.

According to this aspect of the invention, the mobile reality capture device is configured to generate guiding data providing guidance from a current location of the mobile reality capture device to a target location, wherein the guiding data are generated based on a comparison of the three-dimensional map with a known model of the environment, and to activate the guiding unit for providing guidance from the current location of the mobile reality capture device to the target location.

In one embodiment, the known model of the environment is based on probing data of a previous measurement campaign carried out by the mobile reality capture device.

In a further embodiment the mobile reality capture device comprises a positioning unit, particularly based on a global navigation satellite system (GNSS), and/or on radio positioning, and/or on a compass, wherein the guiding data are generated based on positioning data from the positioning unit.

A further aspect of the invention, taken separately or in combination with the other aspects of the invention, relates to a mobile reality capture device configured to be carried and moved by a mobile carrier, particularly a person or a robot or a vehicle, and to be moved during a measuring process for generating a digital representation of an environment, with a localization unit, particularly comprising an inertial measurement unit (IMU), the localization unit being configured for generating localization data for determining a trajectory of the mobile reality capture device, and a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud.

According to this aspect of the invention, the mobile reality capture device has an axial flux motor comprising a rotor and a stator, configured to interact magnetically for driving a rotating component, which provides for the scanning movement about one of the two rotation axes.

In one embodiment, the axial flux motor has: a plurality of coils which are fixedly arranged in the form of a ring about the one of the two rotating axis, wherein the coils have winding axes which are parallel to the one of the two rotation axes; a plurality of magnets which are arranged axially opposite to the coils, wherein adjacent magnets have an alternating polarity; and actuating means configured to actuate the plurality of coils such that an interaction of the coils with the plurality of magnets provides for exerting a torque on the rotating component.

In a further embodiment the coils are arranged on one side of a circuit board, e.g. wherein a flow deflection element is arranged on the other side of the circuit board or wherein a flow deflection element and the circuit board are components of a composite plate.

In a further embodiment the magnets are arranged on a rotor disc which is connected in a rotationally fixed manner to a shaft being connected in a rotationally fixed manner to the rotating component.

In a further embodiment the mobile reality capture device is configured that a bearing preloading of the bearing of the shaft is specifically influenced by an axial force generated by way of selective actuation of the coils.

In a further embodiment the rotor disc is axially surrounded on both sides by a unit, which has in each case fixed coils arranged in the form of a ring, in particular wherein one of these units is the circuit board and wherein the magnets are situated opposite the coils.

In a further embodiment the mobile reality capture device is configured to have an operating mode for energy regeneration during braking of the one of the two rotation axes rotor.

In a further embodiment the mobile reality capture device is configured that for the exerting of the torque on the rotating component, the coils are excited via the actuation means such that the resulting rotating electromagnetic fields exert circumferential magnetic forces onto a rotor disc that is provided with the magnets.

A further aspect of the invention, taken separately or in combination with the other aspects of the invention, relates to a monitoring device for detecting an object within an infrastructure, particularly a building or facility, more particularly an area that is frequently exposed to people and/or vehicles passing through. The monitoring device comprises: a 3D camera for generating a three-dimensional point cloud of the infrastructure; a visual imaging camera, particularly two visual imaging cameras having different viewing directions from each other, wherein each of the two visual imaging cameras has a field of view of at least 180 degrees, and the two visual cameras are circumferentially arranged around the laser scanner; a thermal imaging camera, particularly four thermal imaging cameras having different viewing directions from each other, wherein each of the four thermal imaging cameras has a field of view of at least 80 degrees, and the four thermal imaging cameras are circumferentially arranged around the laser scanner; and a, particularly wireless and/or wired, data interface configured to provide a data stream comprising data from the 3D camera and image data of the visual and thermal imaging cameras to a separate receiving device.

A 3D camera is a device configured for range imaging, which is the name for a collection of techniques that are used to produce a 2D image showing the distance to points in a scene from a specific point, normally associated with some type of sensor device. The resulting image, the range image, has pixel values that correspond to the distance. If the sensor that is used to produce the range image is properly calibrated the pixel values can be given directly in physical units, such as meter.

For example, the monitoring device comprises a high dynamic range (HDR) camera, particularly a single exposure HDR camera, and/or a multispectral camera, particularly a hyperspectral camera.

In a further embodiment, the 3D camera is embodied as one of a stereo-imaging arrangement, a structured light sensor, and a time-of-flight camera.

BRIEF DESCRIPTION OF THE DRAWINGS

The aspects of the invention are described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
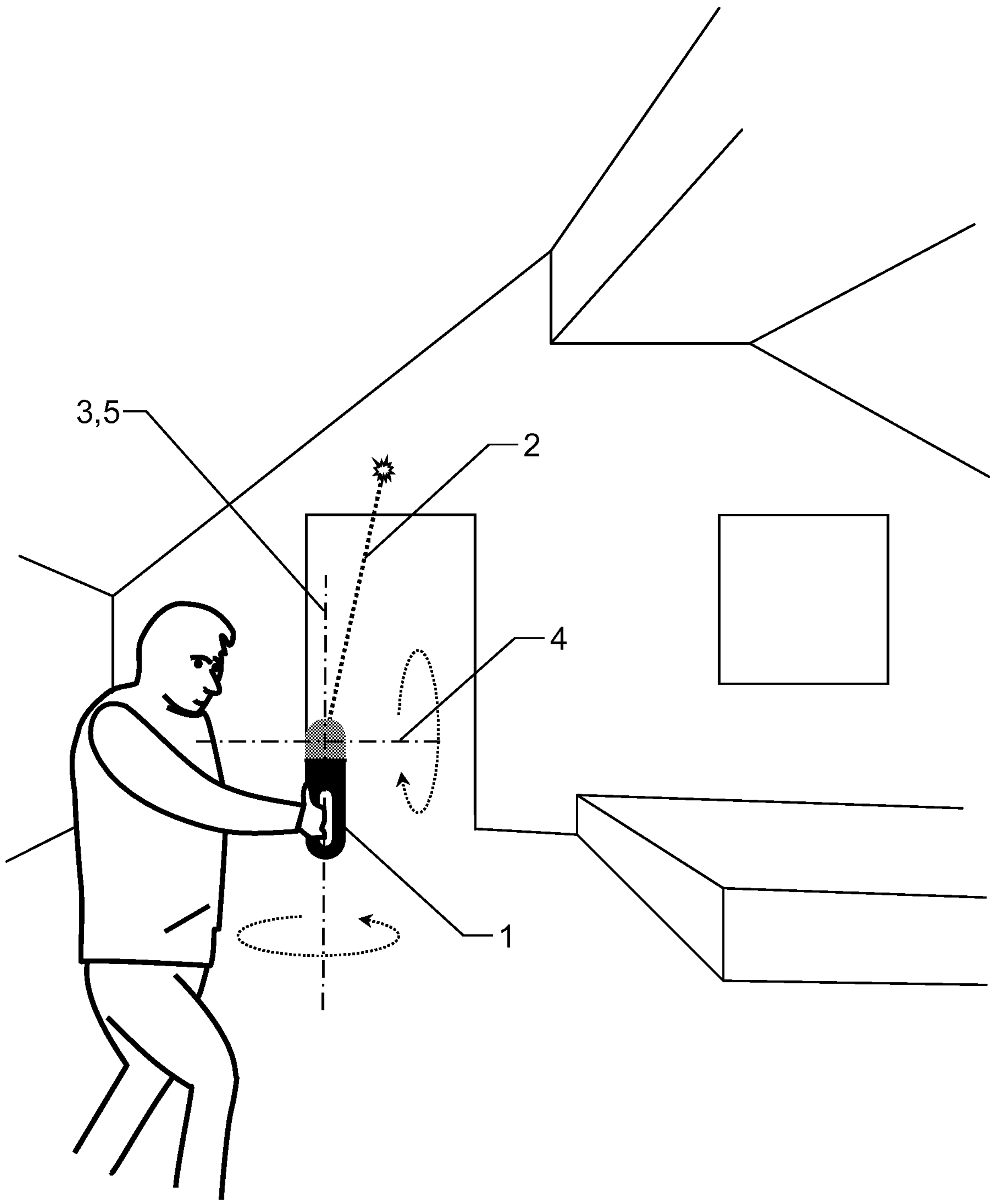
FIG. 1: an exemplary application of the mobile reality capture device in building surveying.

FIG. 1 shows an exemplary application of the mobile reality capture device 1 in the field of architecture or real estate, e.g. wherein an architect or a potential homebuyer would like to have a 3D model of a room or the entire building for providing improved visualization of details or potential extension plans.

The mobile reality capture device 1 comprises a localization unit, e.g. for the purposes of providing a simultaneous localization and mapping functionality, a laser scanner, and a camera unit, wherein the mobile reality capture device is configured to be carried by a user through the room. The room is surveyed during the movement of the mobile reality capture device, wherein the data from the laser scanner and the camera unit are referenced to each other by means of the localization unit, e.g. within the scope of a SLAM functionality.

Thanks to the movement of the user, objects and spatial area can be measured from different angles, as a result of which, shadowing and/or dead angles can be avoided.

The laser scanner is configured to scan the room by means of a laser measurement beam 2, which is moved relative to two rotation axes, e.g. a vertical axis of rotation 3, often referred to as the "slow" axis or azimuth axis, and a rotation axis 4 perpendicular thereto, often also referred to as the "fast" axis or elevation axis.

By way of example, a desired point-to-point resolution is adjustable by adjusting the pulse rate of the laser measurement beam 2 and/or by adjusting the rotational speed about the two rotation axes, wherein often the rotation about the elevation axis 4 is set higher than the rotation about the azimuthal axis 3.

The cameras of a camera unit (see below) are arranged on a lateral surface of the mobile reality capture device, the lateral surface defining a standing axis 5 of the mobile reality capture device, wherein the lateral surface is circumferentially arranged around the standing axis. For example, the camera unit is configured to provide for image data which, essentially instantaneously, cover a visual field of more than 180° around the standing axis 5, particularly 360°.

By way of example, the camera unit comprises one or multiple cameras foreseen to be used in a visual SLAM functionality, one or multiple color cameras, e.g. for colorizing a three-dimensional point cloud, one or multiple high resolution cameras, e.g. for providing a high-resolution detail image, one or multiple high dynamic range (HDR) cameras, e.g. single exposure HDR cameras, one or multiple multispectral, particularly hyperspectral, cameras, e.g. for identification of surface properties or for differentiating different kinds of surfaces, and one or multiple thermal cameras, e.g. for providing temperature information.

The mobile reality capture device 1 may further include other sensors or have additional auxiliary device interfaces, e.g. an interface for attaching a GNSS rover or a display.

In particular, the mobile reality capture device 1 is configured to communicate with an external processing unit of a companion device, e.g. a computer, tablet or smartphone, which is configured to process at least parts of the measurement data of the reality capture device 1, e.g. for referencing the camera data with the laser scanner data or for providing extended display functionality.

In particular, the reality capture device 1 is configured to transmit measurement data to the external processing unit by means of a data streaming started simultaneously or at least close in time relative to the measurement process, e.g. via WLAN or Bluetooth connection, so that the processing of the measurement data on the external processing unit can take place essentially parallel to the data acquisition. For example, this way the measurement data can be displayed continuously for a user as a continuously growing colored 3D point cloud, e.g. by means of a display coupled to the mobile reality capture device 1.

By way of example, the localization unit is configured to determine a trajectory of the mobile reality capture device 1 with six degrees of freedom, i.e. involving position and orientation (pose) of the mobile reality capture device. In particular, the mobile reality capture device 1 may be configured for simultaneous localization and mapping (SLAM) to generate a three-dimensional map by involving at least one of data of an inertial measurement unit (IMU-SLAM), image data of the camera unit for visual SLAM (VSLAM), and light detection and ranging (LIDAR) data of the laser scanner for LIDAR based SLAM mapping (LIDAR-SLAM).

In addition to the localization unit, the reality capture device 1 may be additionally provided with a positioning unit such as a global satellite navigation system transceiver or a compass, e.g. for referencing the data of the mobile reality capture device with a global coordinate system.

Figure 2:
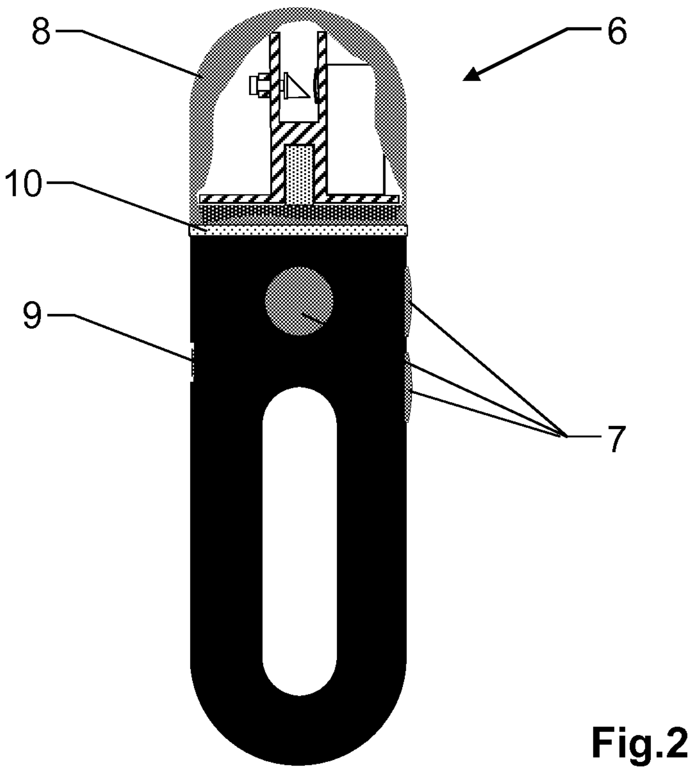
FIG. 2: an exemplary embodiment of a mobile reality capture device according to the invention.

FIG. 2 shows an exemplary embodiment of a mobile reality capture device, comprising a laser scanner 6 and a camera unit with a plurality of cameras 7.

The laser scanner 6 has a cover 8, which is opaque for visible light but optically transmissive for the laser measurement beam. Together with a base of the laser scanner the cover 8 forms a closed housing which is stationary with respect to the mobile reality capture device, wherein all moving parts of the laser scanner 6 are enclosed by the housing.

By way of example, the mobile reality capture device is configured to require only a minimum number of controls integrated into the device. For example, the device has only a single integrated control element 9, which has an activated and an inactive state and is switchable via an external action to assume the activated or the inactive state.

For example, individual measurement programs and/or actions of the reality capture device can be triggered by at least one of: a change of the state of the control element 9 from the inactive to the active state, a change of the state of the control element 9 from the active to the inactive state, a switching of the control element 9 by means of a lasting external effect during a defined period of time (e.g. continuous pressing of a control button), an encoded sequence of state changes of the control element 9 between the active and inactive state, and a coded sequence of temporally lasting external effects on the control element 9 over defined periods of time. Such measurement programs or actions may include at least one of: activating/deactivating the laser scanner 6, starting a defined measuring process, or interrupting/canceling and restarting the measuring process.

The mobile reality capture device can also be configured such that defined measurement programs and actions are stored on the device and/or that new measurement programs and actions can be defined by the user, e.g. via a corresponding input functionality for assigning commands to the states and/or state changes of the control element 9.

By way of example, the mobile reality capture device further comprises, a light indicator 10, e.g. for indicating a device status in such a way that the status indication looks uniform in all azimuthal directions around the standing axis of the reality capture device. Furthermore, the light indicator 10 may be configured to provide guiding instructions (see below).

Figure 3:
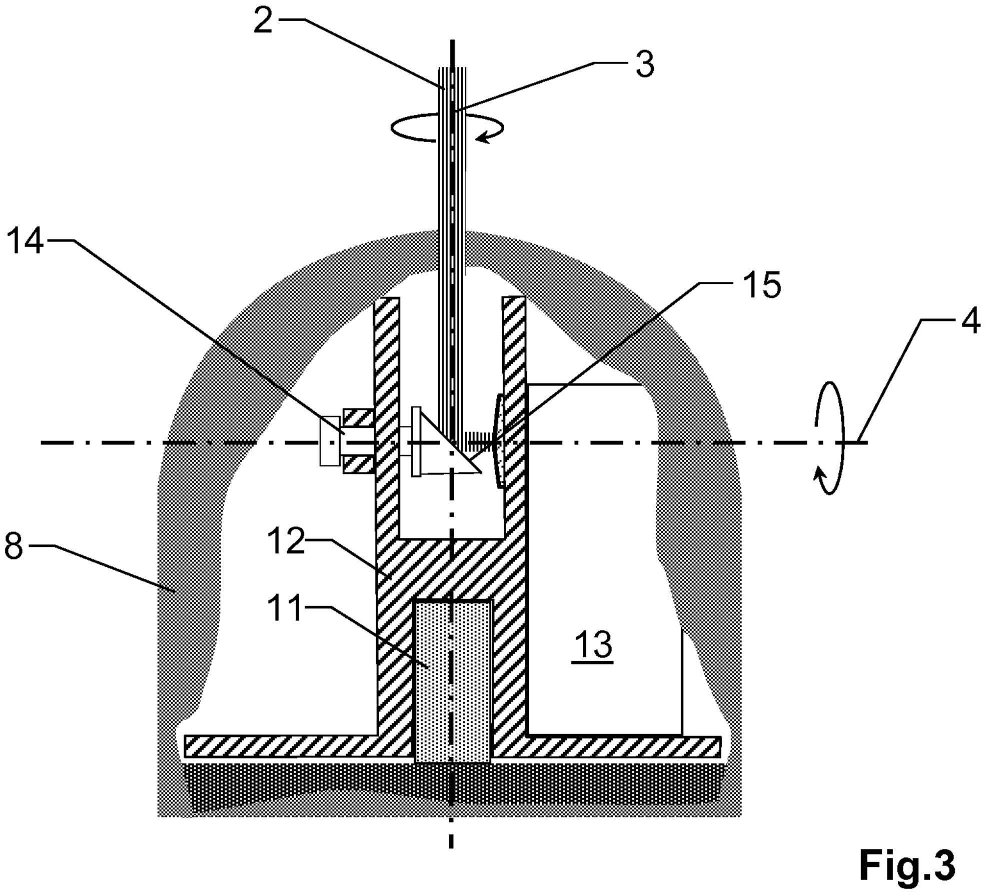
FIG. 3 an exemplary embodiment of a laser scanner to be used within the mobile reality capture device of FIG. 2.

FIG. 3 shows a close-up of the laser scanner 6 from FIG. 2, comprising a base 11 and a support 12, the support 12 being rotatably mounted on the base 11 about a support rotation axis 3. Often the rotation of the support 12 about the support rotation axis 3 is also called azimuthal rotation, regardless of whether the laser scanner, or the support rotation axis 3, is aligned exactly vertically.

The core of the laser scanner 6 is an optical distance measuring unit 13 arranged in the support 12 and configured to perform a distance measurement by emitting a transmission radiation 2, e.g. pulsed laser radiation, and by detecting returning parts of the transmission radiation by means of a receiving unit comprising a photosensitive sensor. Thus, a pulse echo is received from a backscattering surface point of the environment, wherein a distance to the surface point can be derived based on the time of flight, the shape, and/or the phase of the emitted pulse.

In the embodiment shown, the scanning movement of the laser measurement beam about the two rotation axes 3,4 is carried out by rotating the support 12 relative to the base 11 about the support rotation axis 3 and by means of a rotating body 14, which is rotatably mounted on the support 12 and rotates about a beam rotation axis 4.

By way of example, both the transmission radiation 2 and the returning parts of the transmission radiation are deflected by means of a reflecting surface 15 integral with the rotating body 14 or applied to the rotating body 14.

Alternatively, one aspect of the invention relates to the fact that the transmission radiation is coming from the side facing away from the reflecting surface 15, i.e. coming from the inside of the rotating body 14, and emitted into the environment via a passage area within the reflecting surface (see below).

For the determination of the emission direction of the distance measuring beam 2 many different angle determining units are known in the prior art. For example, the emission direction may be detected by means of angle encoders, which are configured for the acquisition of angular data for the detection of absolute angular positions and/or relative angular changes of the support 12 about the support rotation axis 3, or of the rotating body 14 about the beam rotation axis 4, respectively. Another possibility is to determine the angular positions of the support 12 or the rotating body, respectively, by only detecting full revolutions and using knowledge of the set rotation frequency.

A visualization of the data can be based on commonly known data processing steps and/or display options, e.g. wherein the acquired data is presented in the form of a 3D point cloud or wherein 3D vector file model is generated.

Figure 4:
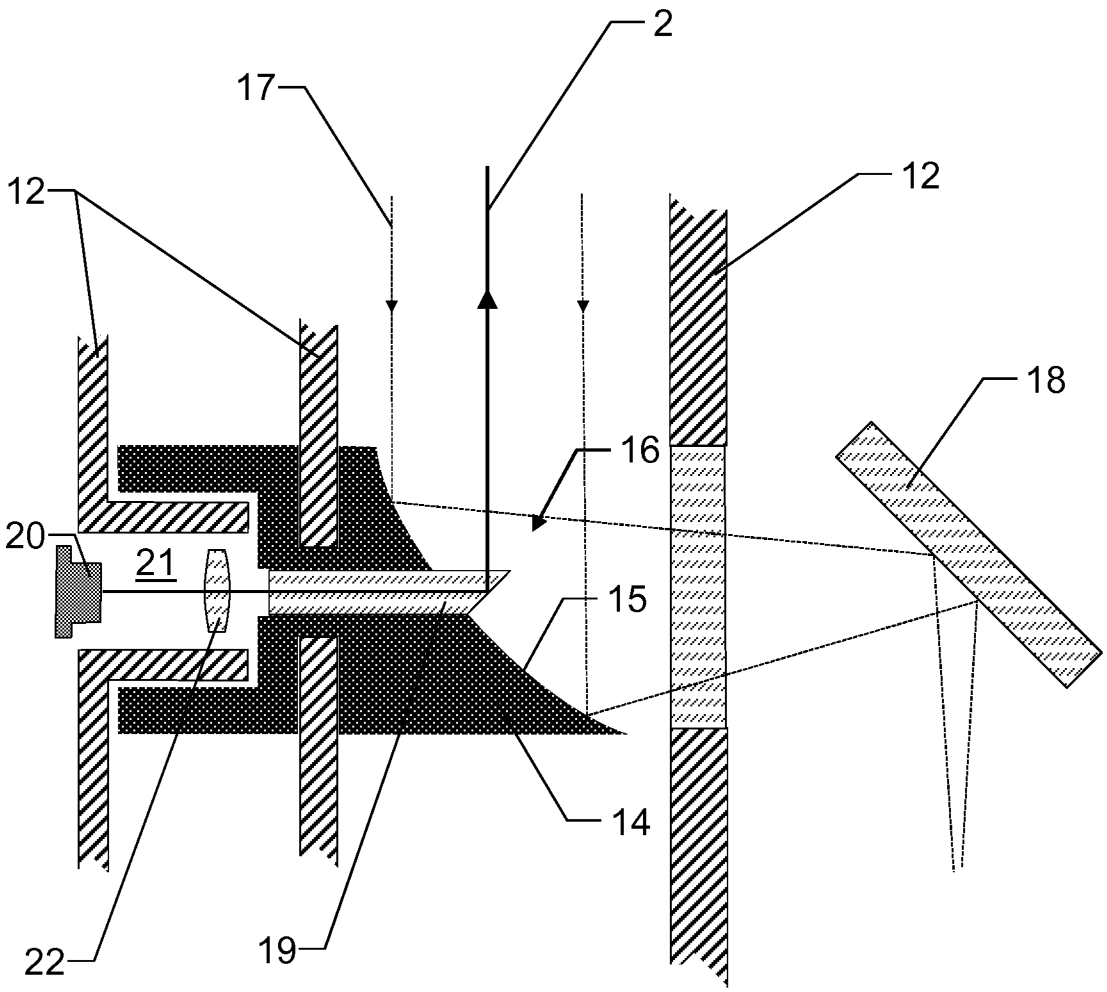
FIG. 4 an exemplary embodiment of a rotating body, configured that the outgoing laser measurement beam coming from the inside of the rotating body is sent into the environment through a passage area.

FIG. 4 shows an exemplary embodiment of a rotating body 14, which is attached to the support 12 and configured for the deflection of the transmission radiation 2 or parts of the transmission radiation returning from the environment about the beam rotation axis.

The rotating body 14 has a passage area 16 for the transmitting radiation 2 arranged in the reflecting surface. The transmission radiation 2 is coming from the side facing away from the reflecting surface 15, i.e. coming from the inside of the rotating body 14.

The parts 17 of the transmission radiation coming back from the environment are deflected by the reflecting surface 15 towards an optical window and forwarded, e.g. by additional stationary deflecting means 18, to a receiver of the optical measuring unit.

For example, this so-called "backward injection of the transmission radiation" has the advantage of enabling a compact design of the laser scanner.

By way of example, the deflection of the transmission radiation 2 is effected by means of a prism 19 arranged in the rotating body 14 and co-rotating with the rotating body, wherein the prism deflects the transmission radiation away from the beam rotation axis, in particular—as in the embodiment shown—to a direction perpendicular to the beam rotation axis.

The rotating body 14 may particularly be configured that the transmitting radiation 2 is emitted by the laser source 20 into a free-beam section 21 within the rotating body 14, e.g. directly or by means of an optical fiber, particularly wherein further additional optics 22 can be arranged within the rotating body 14.

Figure 5:
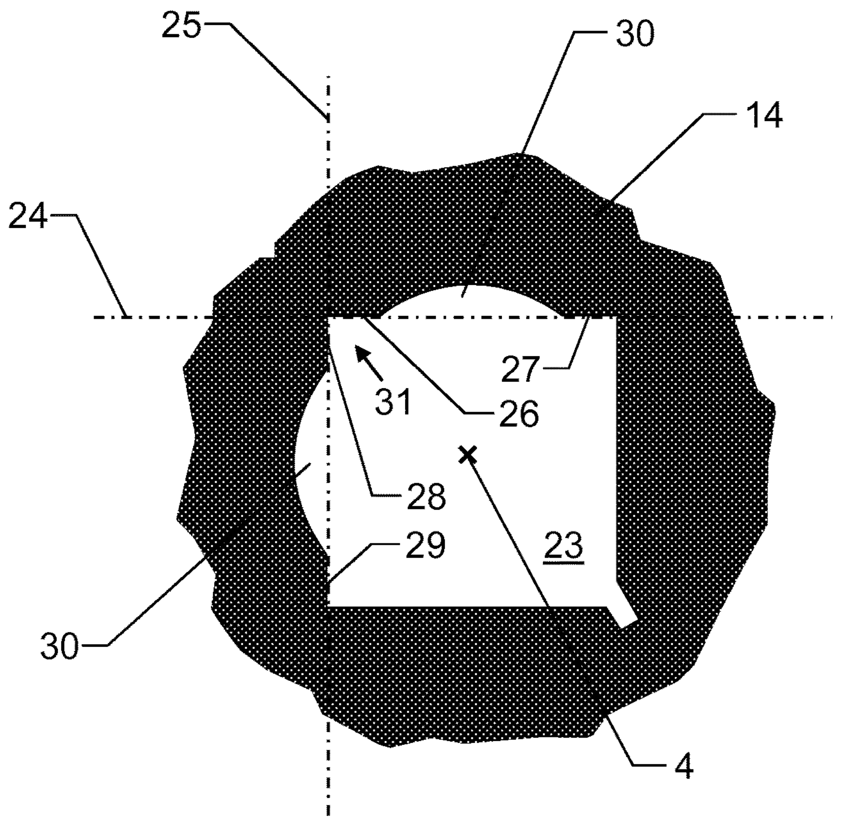
FIG. 5*a* cross section through the rotating body of FIG. 4 without a prism.
Figure 6:
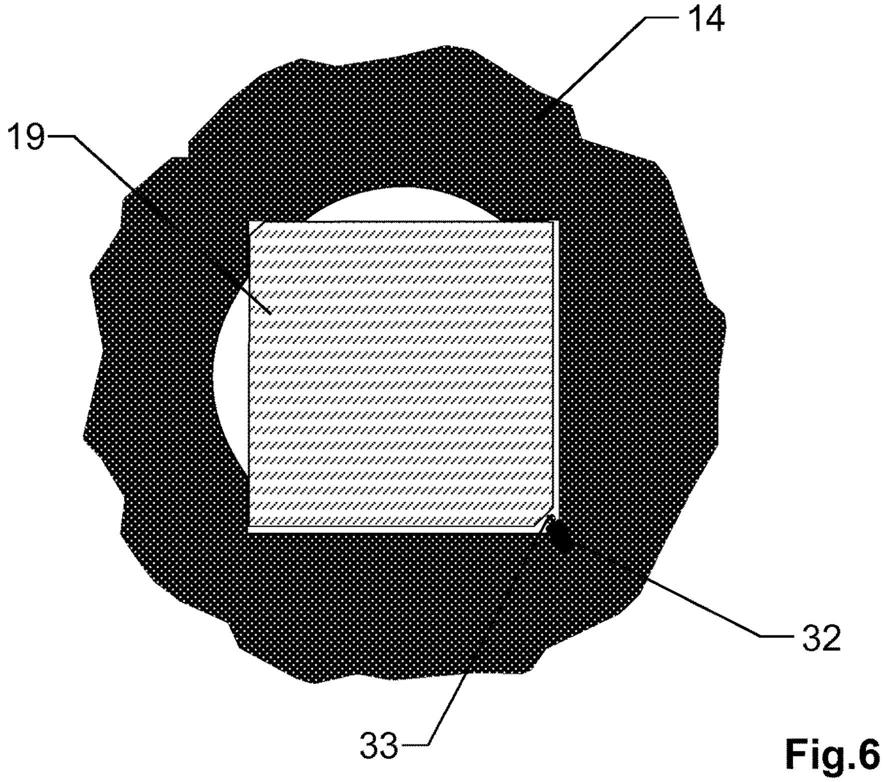
FIG. 6*a* cross section through the rotary body from FIG. 4 with inserted prism.

FIGS. 5 and 6 show a section of a cross section through the rotating body 14 of FIG. 4, comprising an exemplary embodiment of a receptacle 23 formed along the beam rotation axis 4, wherein the receptacle 23 is configured for receiving a prism 19 as deflection component for the transmission radiation 2. FIG. 5 shows the receptacle 23 without prism 19 and FIG. 6 shows the receptacle 23 with built-prism 19.

By way of example, the receptacle 23 has a substantially cuboidal shape for receiving a cuboid prism 19. The cuboid edges define a first 24 and a second 25 stabilization plane. In the embodiment shown, the first stabilization plane 24 has a first 26 and a second 27 contact surface, and the second stabilization plane 25 has a third contact surface 28 and a redundant surface 29 (not used for stabilization of the prism), wherein a recess 30 is formed between the first 26 and second 27 contact surface and between the third contact surface 28 and the redundant surface 29. In this case, the first contact surface 26 adjoins the third contact surface 28, whereby a corner 31 is formed, here a 90 degree corner.

In particular, the prism 19 may have a facet, which frees the corner 31, wherein the prism is pressed by means of a fixing component 32, typically via an intermediate roll over component 33, in the direction of the corner 31, so that the forces on the three contact surfaces 26,27,28 are essentially equal.

A particular aspect of the invention relates to the production of the rotating body 14 or the receptacle 23, respectively, in particular in the light of a compact design of the rotating body 14 and the laser scanner as a whole.

For example, the rotary body 14 is formed by means of a lathe as a solid of revolution, wherein subsequently the recesses 30 of the receptacle 23 are made, e.g. by means of drilling, planing or milling. In particular, the so formed rotating body 14 may have a receptacle 23 for a deflection component, e.g. a prism 19, wherein the receptacle 23—as shown in the image—at the same time has a mirror axis, which is arranged coaxially to the beam rotation axis 4.

Alternatively, the rotating body 14 and the receptacle 23, particularly in case that large quantities have to be produced, may be formed by means of an injection molding process.

Figure 7:
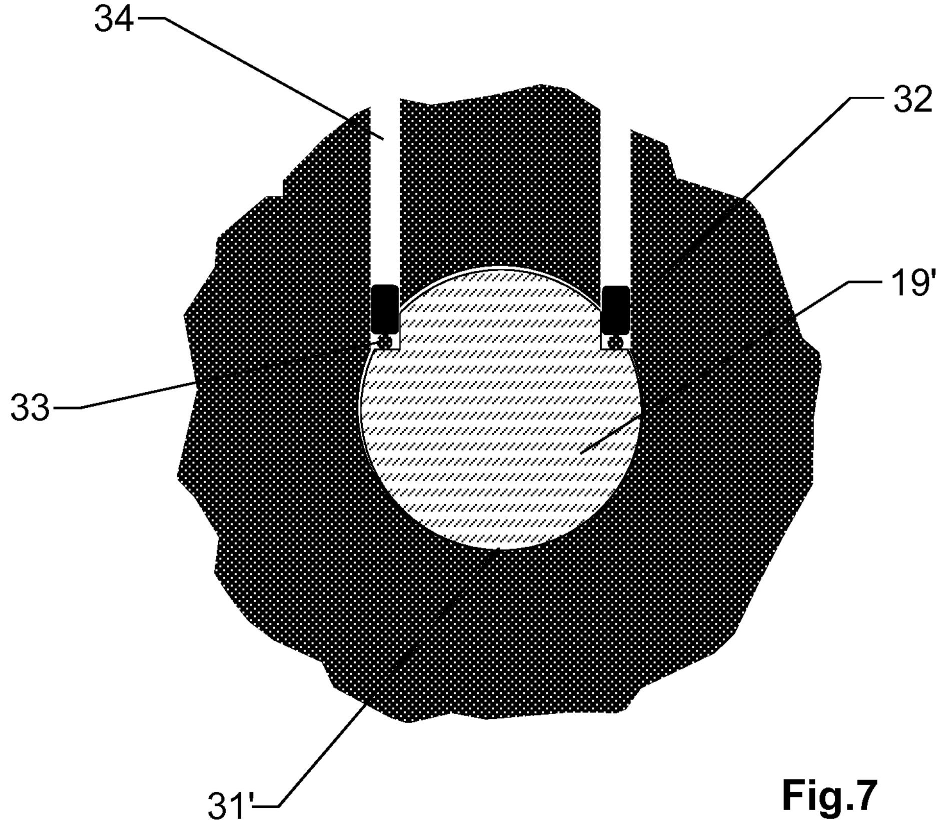
FIG. 7*a* cross section through a rotary body configured to hold a round cylinder prism.

FIG. 7 shows an alternative to the use of a cuboid prism as shown by FIG. 5 and FIG. 6, wherein instead a round cylinder prism 19' is used as deflection component for the transmission radiation within the rotating body.

Here, the receptacle has a rounded pressing region 31' and a countering mechanism, e.g. two screw holes 34, for turning and fixing the received prism 19', again by means of a fixing component 32 and an intermediate roll over component 33.

Figure 8:
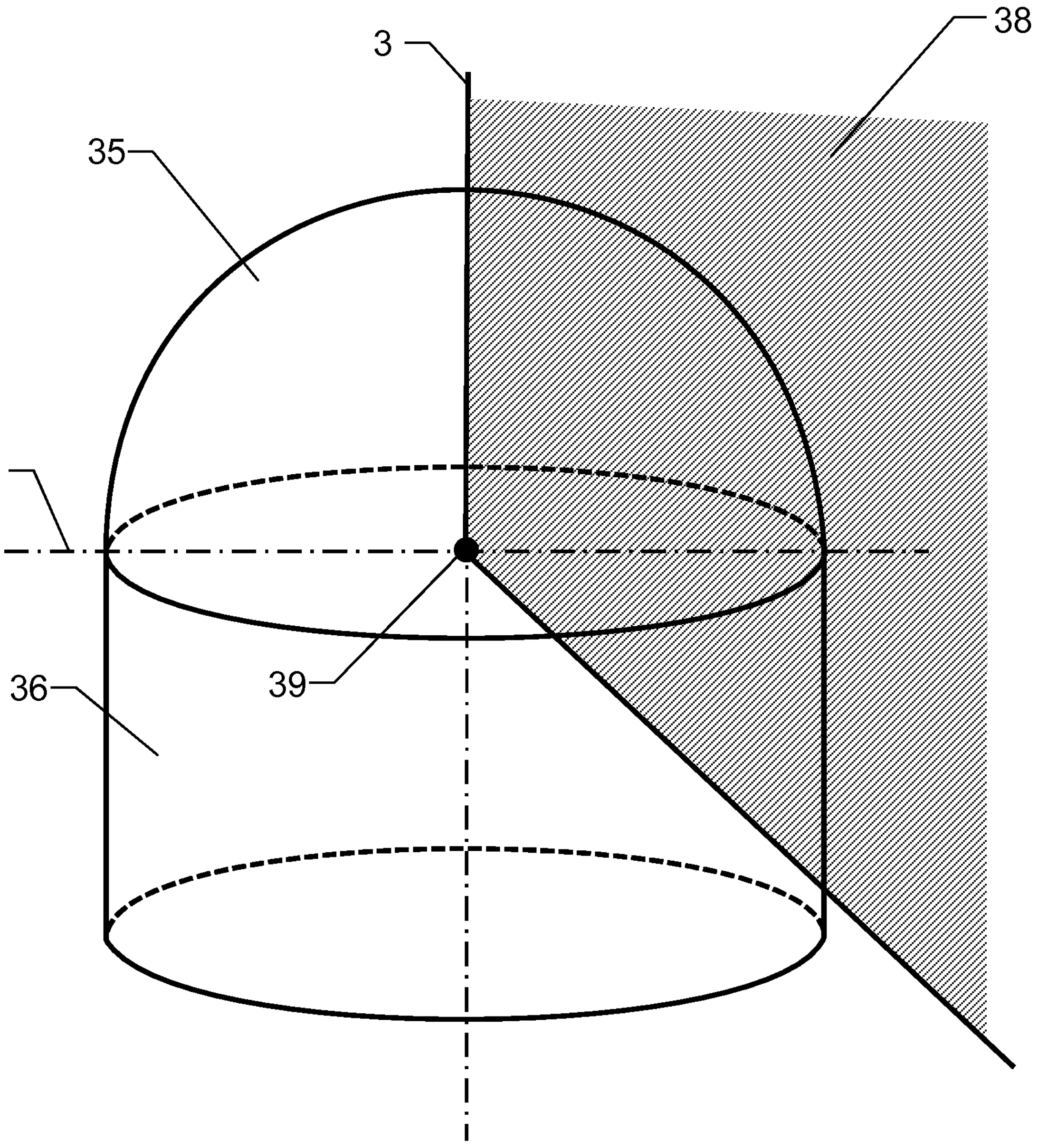
FIG. 8 an exemplary shape of a cover for the laser scanner of FIG. 3.

FIG. 8 shows an exemplary shape of a cover for the laser scanner from FIG. 3 according to a further aspect of the invention. The cover is rotationally symmetrical with respect to the support rotation axis 3 and can be mounted on a substructure (not shown), wherein together with the substructure the cover forms an enclosure, which is resting with respect to the base, of the support 12 and the rotating body 14 (FIG. 3, FIG. 4).

The cover has a substantially hemispherical head part 35, which merges in the direction of the substructure into a cylindrical shell 36.

The cover and substructure are configured to ensure a total field of view of the measuring operation of the laser scanner 6 of 360 degrees in an azimuth direction defined by the rotation of the support 12 about the support rotation axis 3 and at least 120 degrees in a declination direction defined by the rotation of the rotating body 14 about the beam rotation axis 4. In other words, the cover and the substructure are configured such that, regardless of the azimuth angle of the support 12 about the support rotation axis 3, the transmission radiation 2 can cover a vertical field of view 38 spread in the declination direction with a spread angle of at least 120 degrees.

By way of example, the total field of view typically refers to a central reference point 39 of the laser scanner 6 defined by the intersection of the support rotation axis 3 with the beam rotation axis 4.

In the context of the measuring process, distance measurements thus take place both based on transmitting radiation 2 passing through the head part 35 and on transmitting radiation 2 passing through the cylindrical shell 36.

The cross section of the boundary of the cover, in particular the thickness of the boundary as a function of the angle at which the transmission radiation 2 passes through the cover, starting from the reference point 39, affects the beam shape of the transmission radiation. Accordingly, the curvature of the cover may lead to a defocusing of the transmission beam 2 and thus to an increase in the focal length of the laser scanner 6. Accordingly, the boundary is optimized, such that spline based correction parameters can be stored on the laser scanner to correct the beam deflection caused by the cover.

For example, the boundary in the head part 35 has a substantially constant thickness, which is reduced in the cylindrical shell 35 in the direction of the substructure.

Furthermore, the cover may have, for example, a special optical coating, in particular an anti-reflex coating applied by atomic layer deposition (ALD) and/or a scratch-resistant coating.

Figure 9:
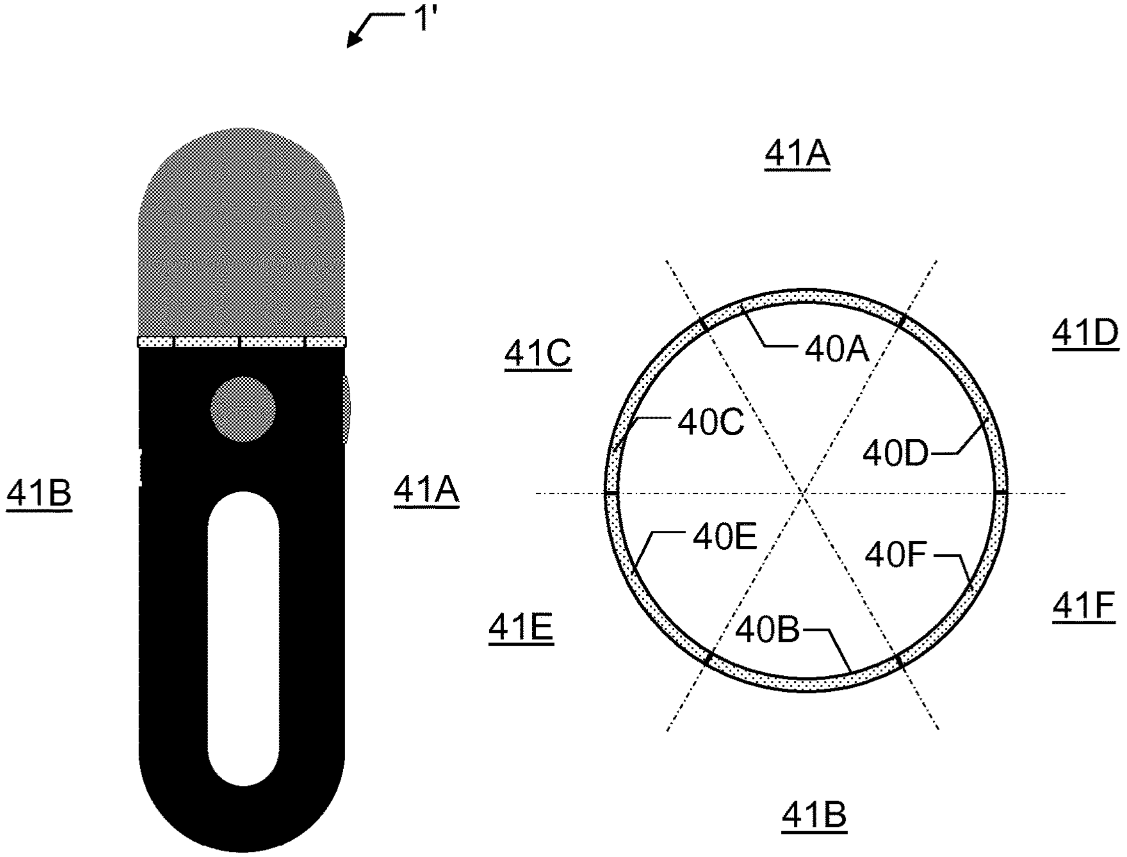
FIG. 9 an exemplary embodiment of multiple light indicators, wherein each of the light indicators is assigned to a scan section fixed relative to the mobile reality capture device.

FIG. 9 shows an exemplary embodiment of a mobile reality capture device 1' having multiple light indicators 40, wherein each of the light indicators is assigned to a scan section fixed relative to the mobile reality capture device 1'.

The left part of the image shows a side view of the mobile reality capture device 1' and the right part shows a top view of the mobile reality capture device, wherein in the top view only the multiple light indicators 40 are shown.

By way of example, the multiple light indicators 40 comprise six light indicators 40A,40B,40C,40D,40E,40F such that the arrangement of each of the light indicators on the lateral surface corresponds with its assigned scan section, a "forward" direction 41A (opposite the control element 9, FIG. 2), a "backward" direction 41B, a "forward left" direction 41C and a "forward right" direction 41D, and a "backward left" direction 41E and a "backward right" direction 41F.

Figure 10:
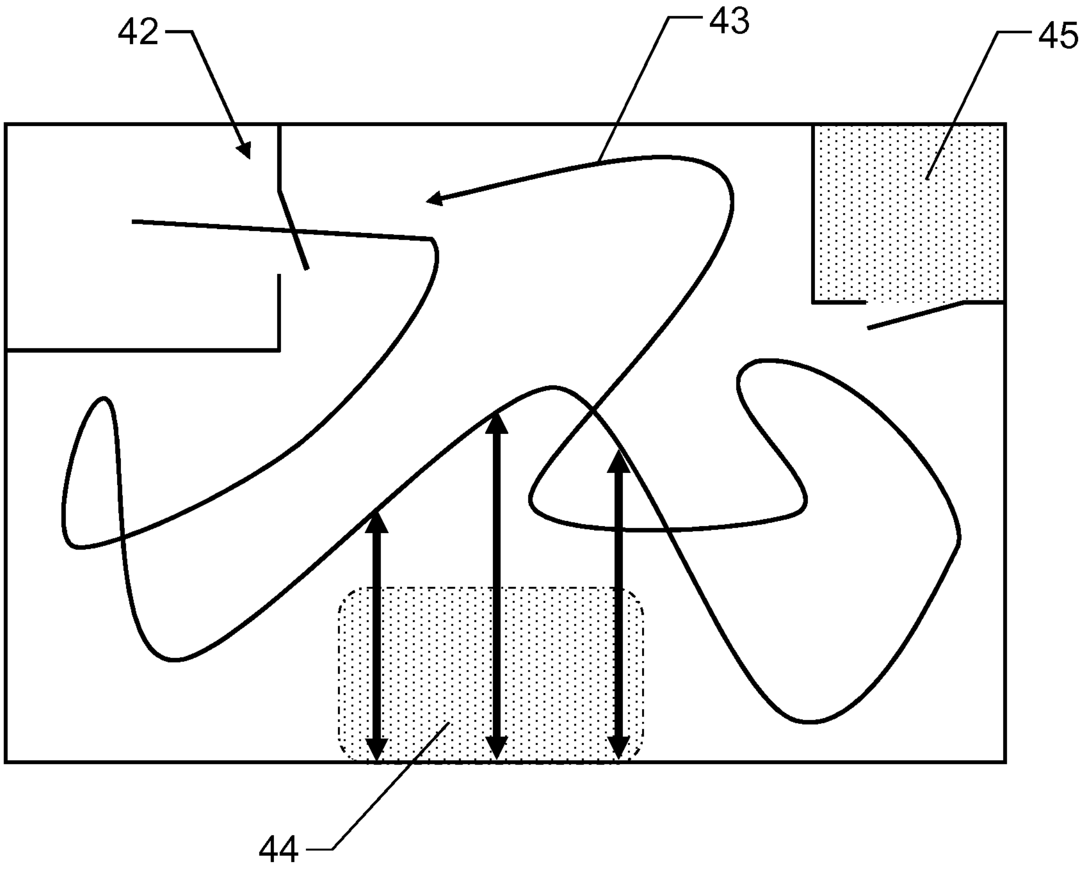
FIG. 10 detection of areas where additional data are required, e.g. to provide guidance to the detected areas by means of the light indicators depicted by FIG. 9.

For example, the light indicators may provide, e.g. in real time, an indication of a quality parameter for probing data acquired within the respective scan section, or the light indicators may provide guidance from a current location of the mobile reality capture device 1' towards an area of the environment, e.g. an area wherein acquisition of additional data is required (see FIG. 10).

FIG. 10 schematically shows a scanning workflow by using the mobile reality capture device 1' of FIG. 9, wherein the mobile reality capture device is configured to carry out a data check, e.g. wherein the device is configured to automatically recognize the end of the measuring campaign based on a recognition of a movement towards an exit 42 of a room upon which the data check is automatically triggered.

The figure shows a top view of a room to be measured, wherein the trajectory 43 of the mobile reality capture device is indicated.

The device has access to model data of the room, e.g. a three-dimensional map generated by a SLAM algorithm of the device or a pre-defined room model, e.g. from a building information model (BIM).

In a first area 44, the reality capture device recognizes that the distance to the wall of the room to be measured was outside a nominal distance range to provide optimal point resolution of the laser scanner. Thus, the device is configured to generate guiding data to guide the user towards the recognized area 44, which has insufficient data quality.

In a second area 45, the mobile reality capture device recognizes a room, which has been missed during the measurement, e.g. by taking into account the pre-defined room model. Also in this case, the device generates guiding data to guide the user to this missed room 45.

For example, guidance may be provided by means of the multiple light indicators 40A-F (FIG. 9).

Figure 11:
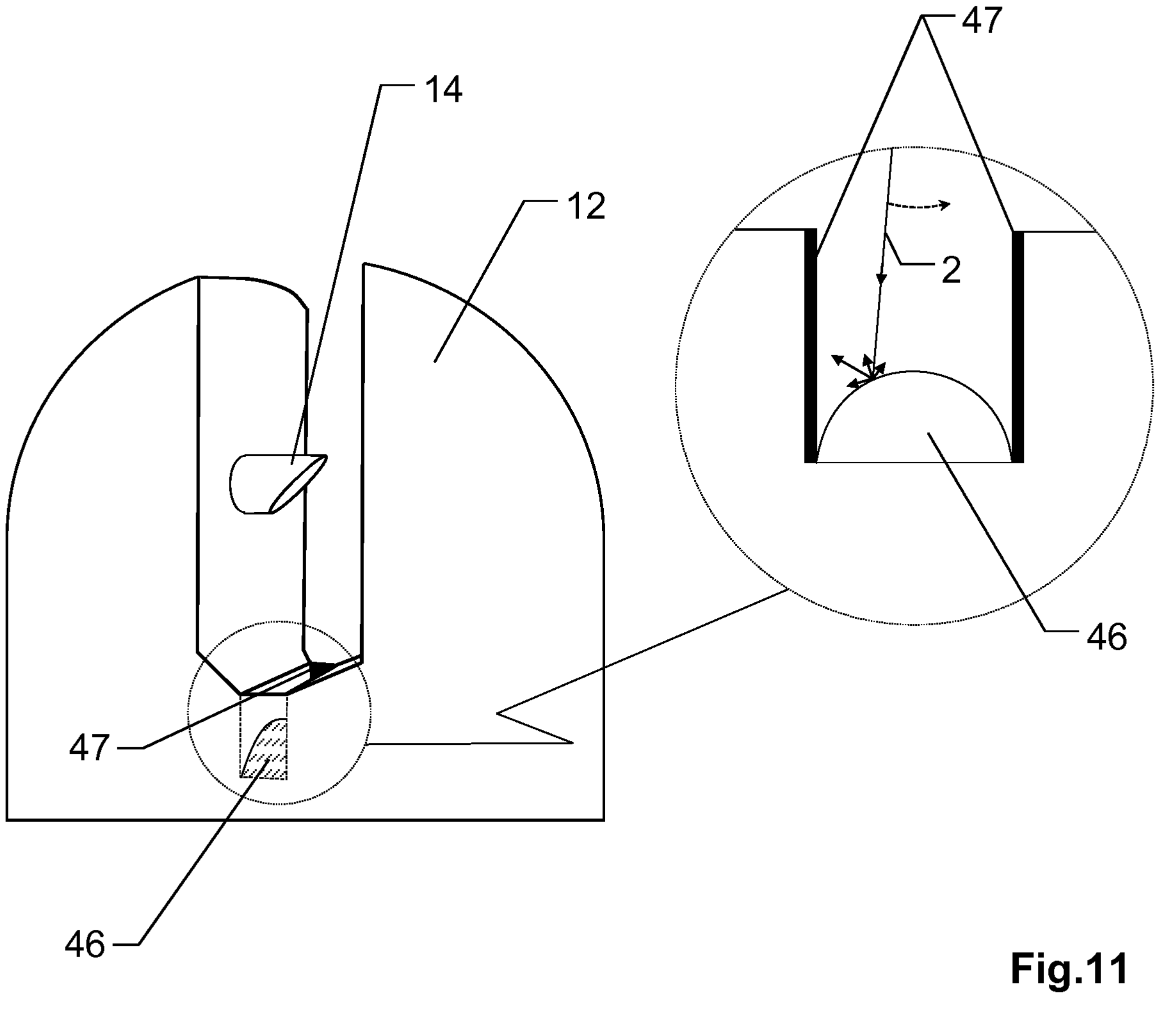
FIG. 11 an exemplary embodiment of a laser scanner comprising a referencing element having a curved surface.

FIG. 11 shows an exemplary embodiment of a laser scanner comprising a referencing element 46 having a curved surface.

In the embodiment shown, the referencing element 46 has a curved surface, which is arched outwards, i.e. in the direction of the rotating body 14, wherein the referencing element 46 is buried in a depression in a nadir area of the support 12. The lateral walls 4 of the depression, which cross the scanning plane by the rotating laser measurement beam 2, are configured to act as a radiation swamp.

Therefore, the referencing element 46 has the effect that the outgoing laser measurement beam 2 generates a track on the curved surface, wherein depending on the track position different incidence angles of the outgoing laser measurement beam 2 with the curved surface are generated and different fractions of light are scattered back along the incident direction of the laser measurement beam 2 (see zoom-in view on the right of the figure, wherein the zoom-in view shows the details from a side perspective relative to the full image).

Figure 12:
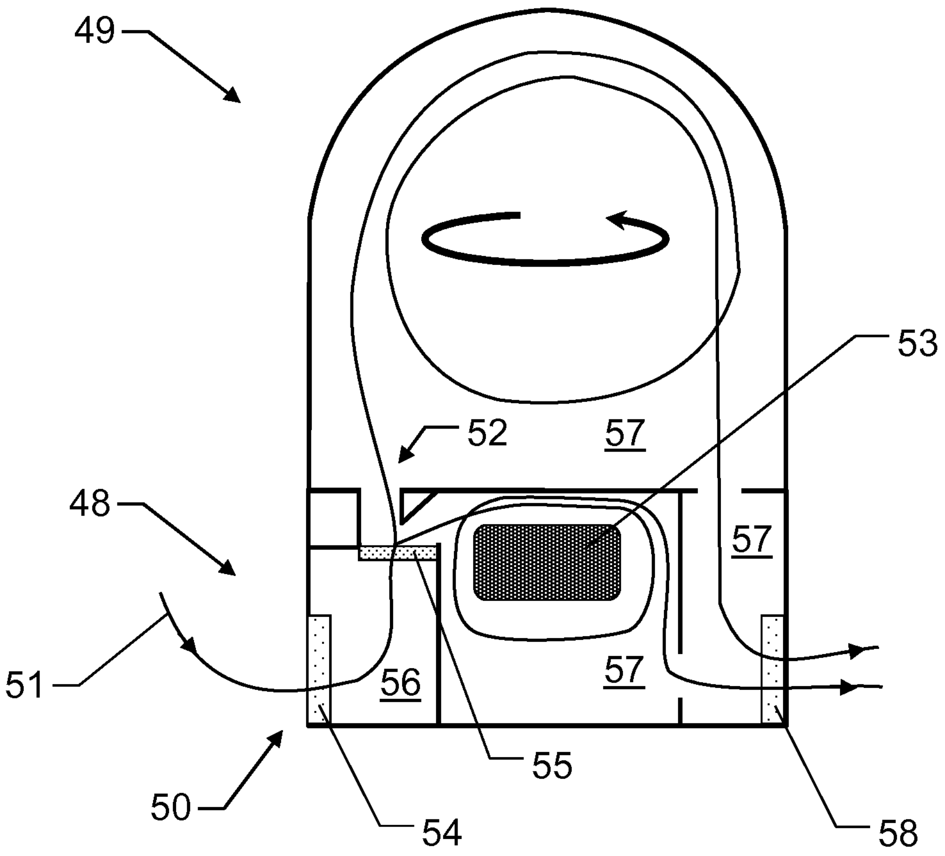
FIG. 12 an exemplary embodiment of a cooling system having a first area, which is free of rotating parts, and a second area comprising rotating parts for a scanning movement of a laser measurement beam, wherein the cooling system has an air entrance to let in external air into the first area.

FIG. 12 shows an exemplary embodiment of a cooling system of a mobile reality capture device, wherein the device has a first area 48, which is free of rotating parts, and a second area 49, which comprises rotating parts of the laser scanner to provide a scanning movement of the laser measurement beam.

The mobile reality capture device has a pumping device (not shown) for driving an airflow comprising external air, an air entrance 50 to let in the external air 51 into the first area 48, and an air passage 52 to forward air from the first area, i.e. the air that entered over the air entrance 50, into the second area 49. In the embodiment shown, the reality capture device is further configured to separately pass air from the first area into an area comprising cooling ribs 53.

Furthermore, the cooling system comprises a two-stage filtering system, with a first filter 54, which is at least a rainproof filter, and a second filter 55, which has a finer filter fineness than the first filter 54. The first filter 54 is arranged ant the air entrance 50 and separates the internal space of the cooling system from the ambiance, wherein the second filter 55 is arranged in the internal space and separates the internal space in a dirty inner zone 56 lying upstream of the second filter 55 between the first filter 54 and the second filter 55 and a clean inner zone 57 lying downstream of the second filter between the second filter and an air outlet 58 for releasing air into the ambiance. For example, the air outlet 58 comprises the same kind of filter as the first filter to protect the internal space from contamination by refluxing air from the outside.

Figure 13:
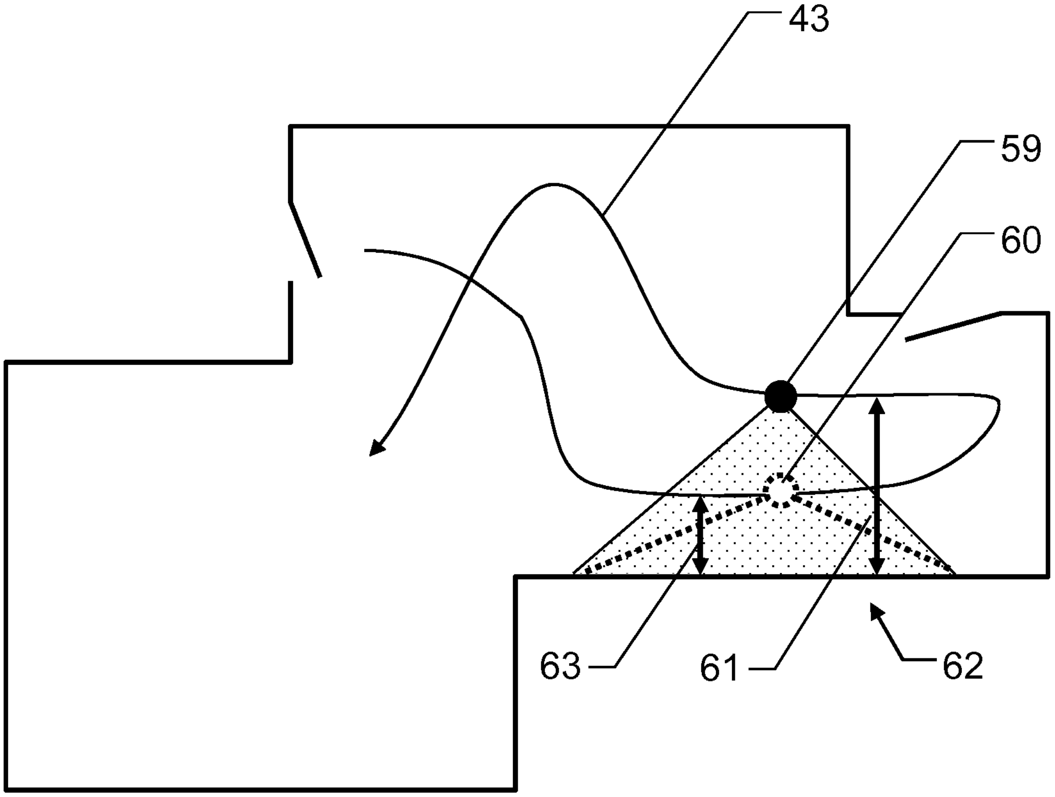
FIG. 13 control of data storage by taking into account an evaluation of a geometric relationship between an acquisition position and an area to be probed from the acquisition position.

FIG. 13 schematically shows a scanning workflow, wherein redundant data are deleted by taking into account an evaluation of a geometric relationship between an acquisition position and an area to be probed from the acquisition position.

The figure shows a top view of a room to be measured, wherein the trajectory 43 of the mobile reality capture device is indicated.

Here, the mobile reality capture device has a data evaluation unit, configured to carry out an evaluation of a geometric relationship between an acquisition position of the mobile reality capture device and an area to be probed. For example, the mobile reality capture device may have a SLAM unit, e.g. a visual SLAM unit, which provides a three-dimensional map of the environment. This allows the evaluation unit to determine the current location 59 of the mobile reality capture device within the three-dimensional map and to derive for this point geometric relations with respect to the surroundings at this point.

By way of example, the evaluation unit notices that, compared to a previous location 60 of the mobile reality capture device on the trajectory 43, a current distance 61 to a previously captured area 62 is now better suited to match the focal distance of a camera unit of the mobile reality capture device as compared to the distance 63 corresponding to the previous location 60.

Therefore, image data corresponding to the previous acquisition can be automatically deleted without requiring an extensive on-device data analysis. Thus, redundant data can be deleted close to the sensor, which, for example, has benefits regarding required storage volume and data transfer rate to a companion device.

Figure 14:
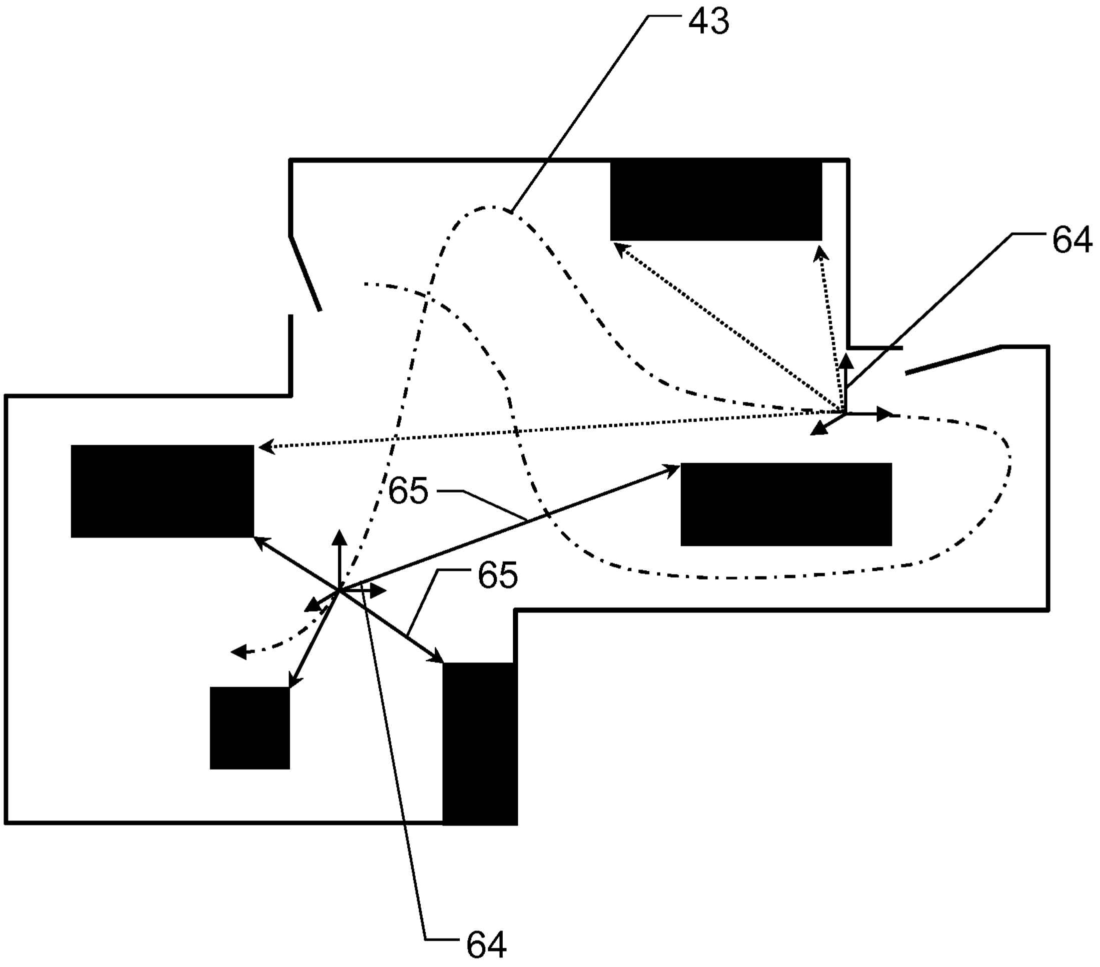
FIG. 14 re-initialization of a SLAM unit by recalling a relative positional relationship between SLAM features and position of the mobile reality capture device along the previous trajectory.

FIG. 14 schematically shows a scanning workflow, wherein the mobile reality capture device is configured for re-initialization of a SLAM unit by recalling a relative positional relationship between SLAM features and a position of the mobile reality capture device along the previous trajectory.

The figure shows a top view of a room to be measured, wherein the trajectory 43 of the mobile reality capture device is indicated.

The mobile reality capture device has SLAM unit configured to generate a 3D map, wherein the 3D map is generated by identifying different prominent features within the environment, e.g. corners or features with distinct reflection properties. For example, the SLAM unit may be based on a visual SLAM algorithm, wherein the SLAM unit matches prominent features present in continuously generated images to spatially link the scenes represented by these images to each other.

According to this aspect of the invention, the reality capture device further has a feature tracker. For different points along the trajectory, the feature tracker determines and stores a relative position of identified features 65, i.e. in a local coordinate system 64 associated to the current position. Then, in case of a measurement interruption, e.g. due to a power failure or in case the work from a previous measuring campaign is continued, the user has to re-establish a location close to the last position along the trajectory, wherein the mobile reality capture device is configured to re-initialize the SLAM unit for continuing the generation of the 3D map by recalling a series of relative feature positions corresponding to the most recent positions of the mobile reality capture device along the trajectory 43.

Figure 15:
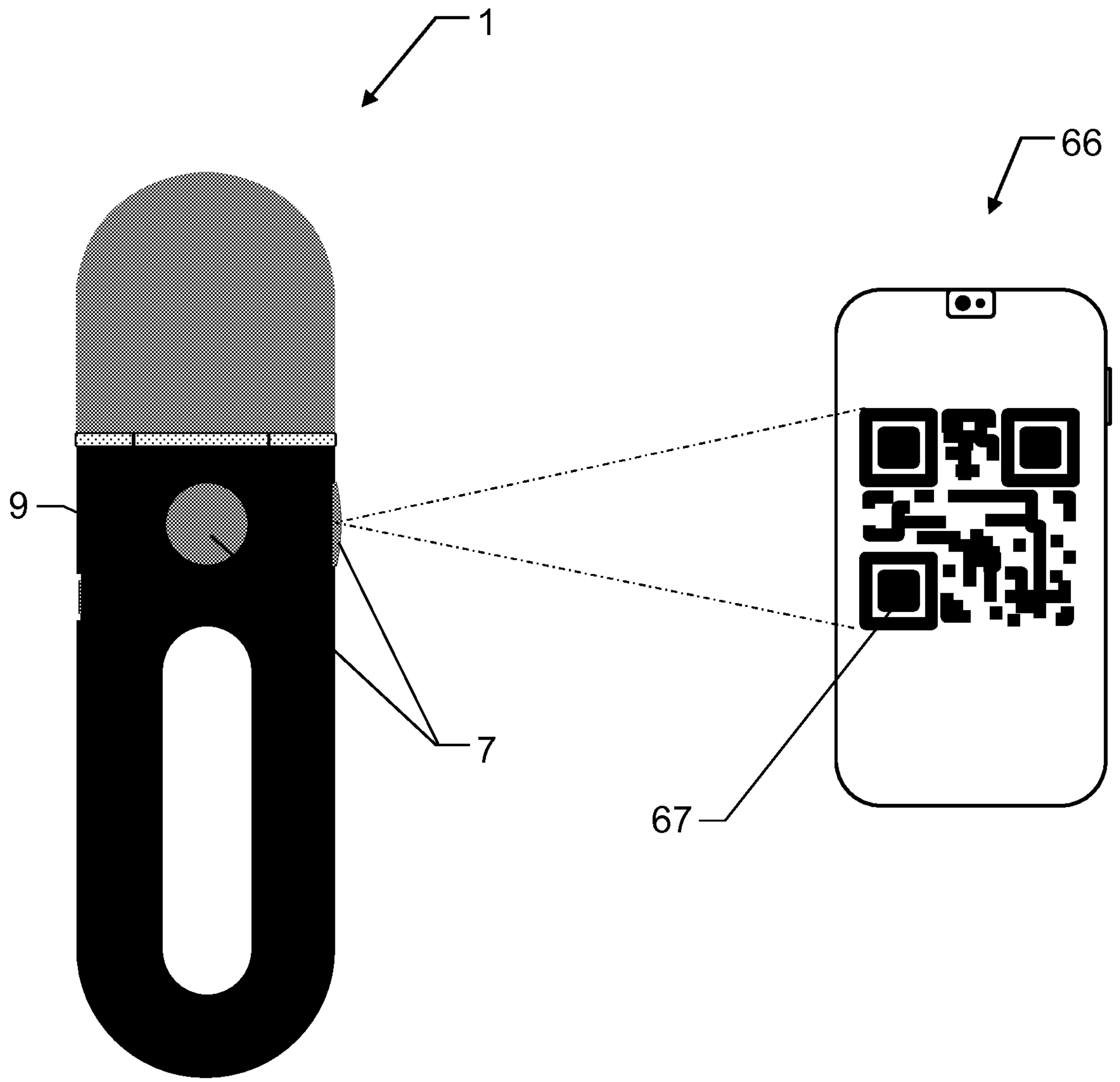
FIG. 15 system comprising a mobile reality capture device and a companion device, which are configured to establish a server-client communication.

FIG. 15 shows an exemplary system comprising a mobile reality capture device 1 and a companion device 66, e.g. a tablet or a smartphone.

In the embodiment shown, the companion device 66 is configured to act as a server of a server-client communication protocol, wherein the mobile reality capture device 1 is configured to act as client. The access data for the server-client communication, e.g. a service set identifier (SSID) and a password for the server, is encoded into a matrix barcode 67, e.g. a QR code, displayed on the companion device 66. The mobile reality capture device has a camera 7, which may take an image of the matrix barcode 67 upon manual trigger by a user, e.g. by pressing the control element 9. The mobile reality capture device 1 is then configured to automatically recognize the matrix barcode 67 in the image, to automatically decode the matrix barcode, and to automatically establish the server-client communication upon decoding the matrix barcode 67.

Figure 16:
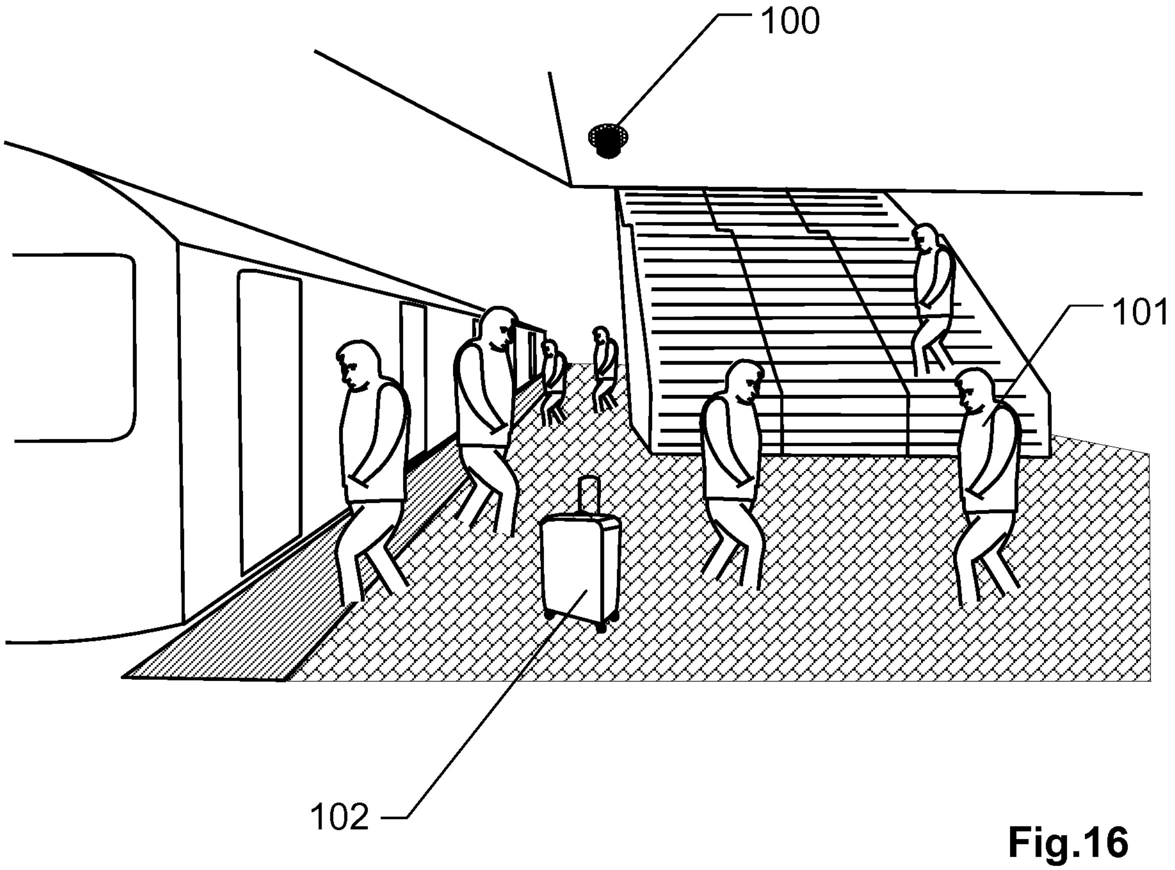
FIG. 16 an exemplary application of a reality capture device as monitoring device, here for monitoring of a subway station.

FIG. 16 shows an exemplary application of a reality capture device as monitoring device 100 in a crowded area, here for monitoring of a subway station. Typically, a monitoring system comprises a multitude of such monitoring devices 100, which are distributed within the infrastructure in order to provide full coverage with a minimum of blind spots.

A multitude of moving objects 101, e.g. pedestrians, trains, subway passengers, and marketers, are moving within the area, wherein a monitoring system making use of such monitoring devices 100 may be particularly configured for automatically tracking the moving objects 101 and for automatically detecting a left behind object 102, e.g. a suitcase which could potentially comprise harmful substances or explosives.

Figure 17:
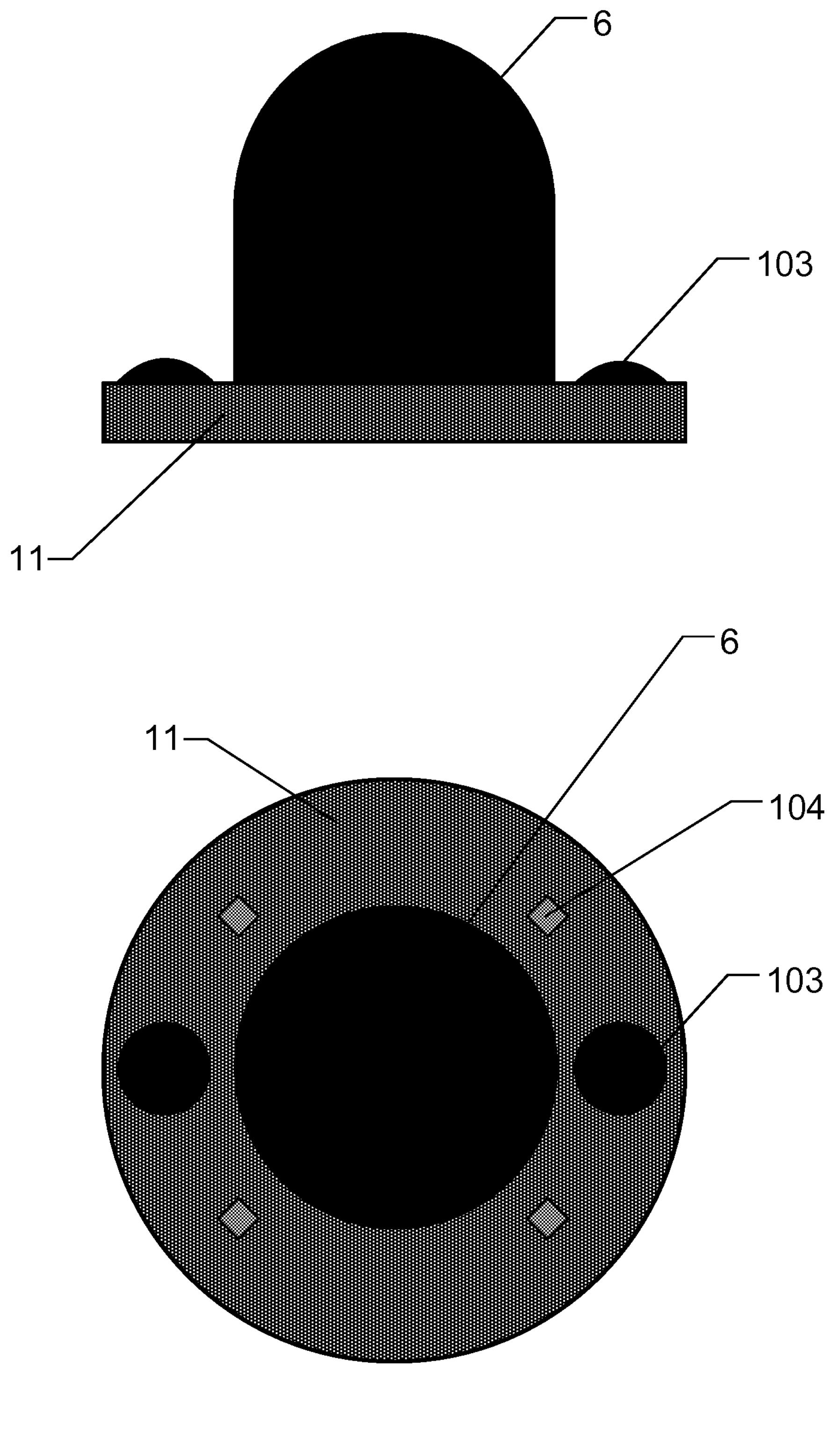
FIG. 17 an exemplary embodiment of a monitoring device according to the invention.

FIG. 17 shows an exemplary embodiment of a reality capture device embodied as monitoring device 100. The top part of the figure shows a side view of the monitoring device 100 and the bottom part of the figure shows a top view of the monitoring device 100.

The monitoring device 100 comprises a laser scanner 6 configured for a scanning movement of a laser measurement beam relative to two rotation axes, and, based thereof, to generate light detection and ranging (LIDAR) data for generating a three-dimensional point cloud.

The base 11, which supports the laser scanner is configured as a common sensor platform, which also supports the cameras of a camera unit. In the embodiment shown, the camera unit comprises two visual imaging cameras 103, each visual camera 103 having a field of view of at least 180 degrees, and four thermal imaging cameras 104, each of the four thermal imaging cameras 104 having a field of view of at least 80 degrees.

The two visual cameras 103 are placed on a circumference around the laser scanner 6 with an angular separation of 180 degrees, and the four thermal cameras 104 are placed on a circumference around the laser scanner 6 with an angular separation of 90 degrees with respect to each other.

Figure 18:
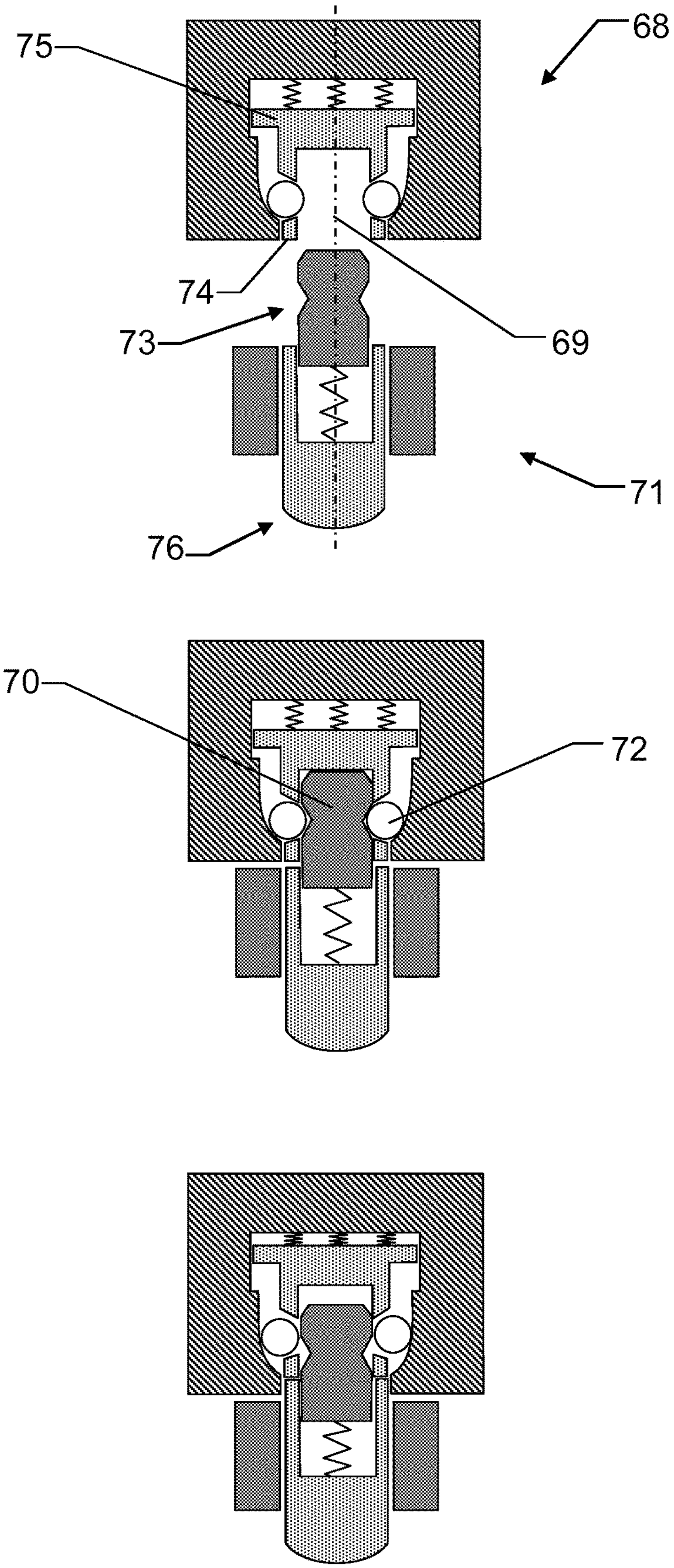
FIG. 18 an exemplary embodiment of receptacle for attaching the mobile reality capture device to an additional component.

FIG. 18 shows an exemplary embodiment of a receptacle 68 for attaching the mobile reality capture device to an additional component.

The receptacle 68 has depression for receiving, along a penetration axis 69, a pin 70 of a connector 71 of an additional component to the mobile reality capture device, and a locking mechanism. The locking mechanism comprises locking bodies 72, e.g. spheres, which, in a locking position, are pushed radially inwards towards the penetration axis 69 in order to engage in a cavity 73 of the pin 70. The locking mechanism is configured that the locking position is its basic position. The locking mechanism can be set into a release position by pushing a contact element 74 in a direction along the penetration axis 69, which enables the locking body 72 to radially escape and thus to release the pin 70.

In the embodiment shown, the locking mechanism comprises a sliding element 75 configured to be axially movable along the penetration axis 69, wherein prestressing springs push the sliding element 75 into a basic position, which pushes the locking bodies 72 radially inwards.

The connector 71 comprises the pin 70, having a circumferentially continuous cavity 73, wherein the connector has a release mechanism 76 configured to push, in the locking position, the contact element 74 of the receptacle 68 in the direction along the penetration axis 69.

The top of the figure shows a connector 71 which is currently moved into the receptacle 68. The middle of the figure shows the connector fixed in the receptacle, which is in its locked position.

The bottom of the figure shows the connector 71 located in the receptacle 68, wherein the release mechanism is activated and the receptacle is in its release position.

Figure 19:
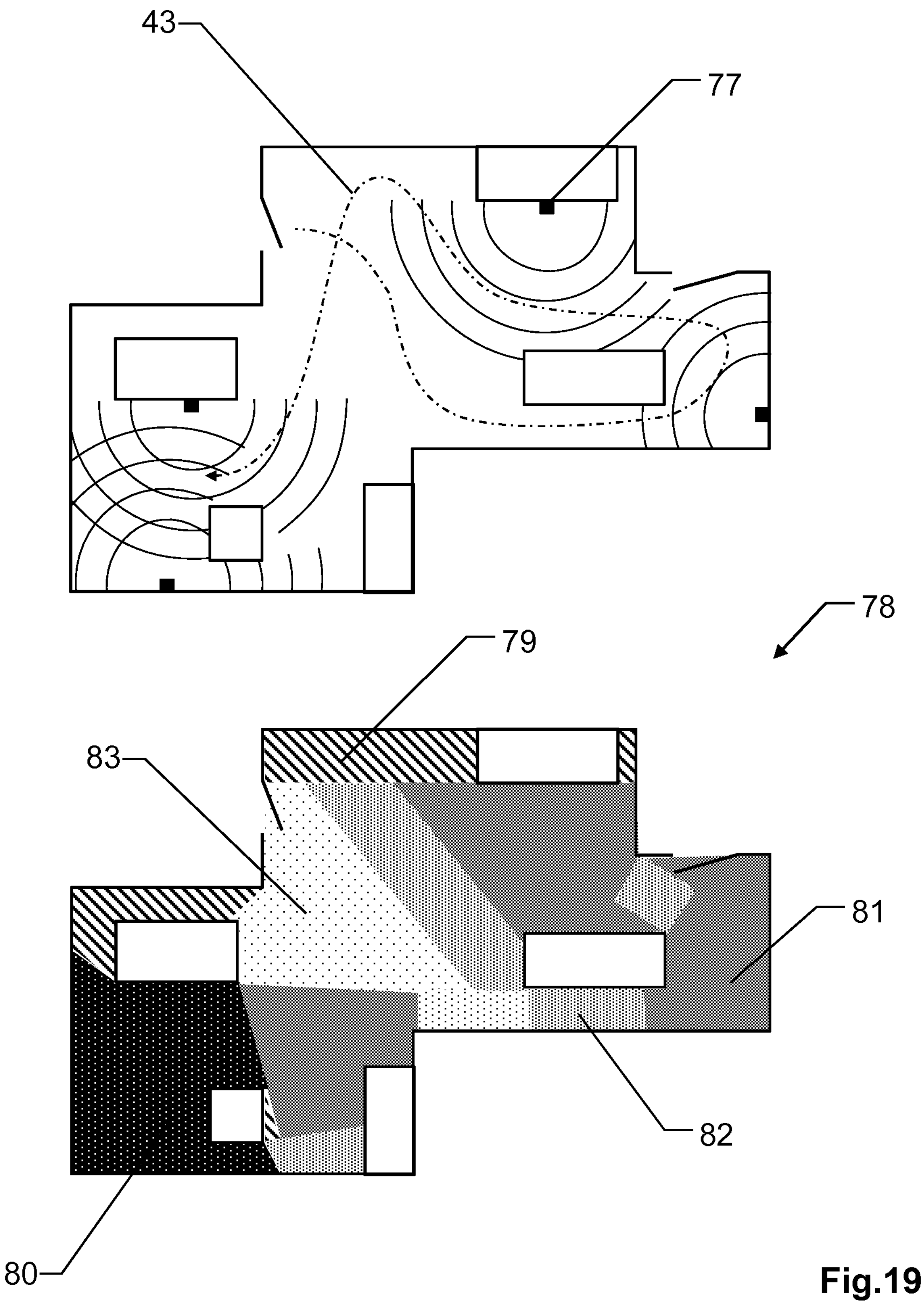
FIG. 19 determination of a signal strength of a radio signal, which is available along the trajectory of the mobile reality capture device for determining a heat map indicating a classification of the environment into different radio signal reception areas.

FIG. 19 exemplarily shows a workflow using a mobile reality capture device having a radio signal module, e.g. a WLAN module, for determining a signal strength of a radio signal, which is available along the trajectory 43 of the mobile reality capture device.

On the top, the figure shows a top view of a room to be measured, wherein the trajectory 43 of the mobile reality capture device is indicated.

Distributed in the room are a multitude of WLAN transmitters 77, wherein for each WLAN transmitter the propagation of the WLAN signal is indicated. According to this aspect of the invention, the mobile reality capture is configured to provide a data set comprising a series of determined signal strengths of the WLAN signal, wherein each signal strength is associated to a position of the mobile reality capture device along the trajectory 43.

By way of example, as indicated in the bottom of the image, such a data set may then be used to generate heat map 78 indicating a classification of the room into different radio signal reception areas, e.g. wherein areas of no reception 79, very strong reception 80, strong reception 81, intermediate reception 82, and low reception 83 are identified.

Furthermore, such data may be used for WLAN based localization, e.g. to be used by a smartphone.

Although the invention is illustrated above, partly with reference to some preferred embodiments, it must be understood that numerous modifications and combinations of different features of the embodiments can be made. All of these modifications lie within the scope of the appended claims.

The invention claimed is:

1. Mobile reality capture device configured to be carried and moved by a person and to be moved during a measuring process for generating a digital representation of an environment, comprising:

a localization unit, particularly comprising an inertial measurement unit (IMU), the localization unit being configured for generating localization data for determining a trajectory of the mobile reality capture device, a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud, a base supporting the laser scanner, a cover, particularly a cover which is opaque for visible light, mounted on the base such that the cover and the base encase all moving parts of the laser scanner, such that from the outside no moving parts are touchable, and a panoramic camera unit arranged on a lateral surface of the mobile reality capture device, the lateral surface defining a standing axis of the mobile reality capture device, namely wherein the lateral surface is circumferentially arranged around the standing axis, wherein the laser scanner comprises:

a support, mounted on the base and being rotatable relative to the base, and a rotating body for deflecting the outgoing laser measurement beam and returning parts of the laser measurement beam, the rotating body being mounted on the support and being rotatable relative to the support, wherein the generation of the LIDAR data comprises:

a continuous rotation of the support relative to the base and a continuous rotation of the rotating body relative to the support, and emission of the laser measurement beam via the rotating body, which continuously rotates, and detection of parts of the laser measurement beam returning via the rotating body, wherein the laser scanner is configured that the continuous rotation of the rotating body relative to the support is faster than the continuous rotation of the support relative to the base, the continuous rotation of the support is at least 0.1 Hz and the continuous rotation of the rotating body is at least 50 Hz.

2. Mobile reality capture device according to claim 1, wherein:

the localization unit has an inertial measurement unit (IMU) for generating inertial data for the mobile reality capture device, the IMU comprising two inertial sensors, one of the inertial sensors is mounted on a part of the laser scanner, which rotates during the measuring process, the other one of the inertial sensors is mounted on a part of the laser scanner which is static relative to the base during the measuring process, and the localization unit is configured to determine a drift in the inertial data for the mobile reality capture device by comparing data of the two inertial sensors, taking into account a rotation parameter describing the relative rotation between the two inertial sensors.

3. Mobile reality capture device according to claim 1, wherein the localization unit is configured that the localization data are based on at least part of the LIDAR data, and the mobile reality capture device is configured for carrying out a LIDAR-based localization and mapping algorithm.

4. Mobile reality capture device according to claim 1, wherein the panoramic camera unit is configured to provide for image data which cover a visual field of at least 120° around the standing axis, particularly at least 180°, more particularly 360°.

5. Mobile reality capture device according to claim 1, wherein the mobile reality capture device comprises a localization camera for being used by the localization unit, particularly wherein the localization camera is part of the panoramic camera unit, the localization unit is configured that the localization data are based on image data generated by the localization camera.

6. Mobile reality capture device according to claim 5, wherein the mobile reality capture device comprises multiple localization cameras for being used by the localization unit, the multiple localization cameras are configured and arranged that, for a nominal minimum operating range of the localization unit, each of the multiple localization cameras has a field of view overlap with at least another one of the multiple localization cameras.

7. Mobile reality capture device according to claim 1, wherein the mobile reality capture device comprises a color camera configured to capture color images, the mobile reality capture device is configured to provide point cloud data for generating a colored three-dimensional point cloud based on the LIDAR data and the color images.

8. Mobile reality capture device according to claim 1, wherein the laser scanner is configured that for generating the LIDAR data the two rotation axes rotate faster than 0.1 Hz, particularly faster than 1 Hz, the LIDAR data are generated with a point acquisition rate of at least 300,000 points per second, particularly at least 500,000 points per second.

9. Mobile reality capture device according to claim 1, wherein the cover provides a field of view of the laser scanner which is larger than half of a unit sphere around the laser scanner.

10. Mobile reality capture device according to claim 9, wherein the cover has a hemispherical head part, which merges in the direction of the base in a cylindrical shell, the laser scanner is configured that the LIDAR data are generated based on an orientation of the laser measurement beam where it passes through the hemispherical head part and an orientation of the laser measurement beam where it passes through the cylindrical shell.

11. Mobile reality capture device according to claim 1, wherein the cover is made of a material comprising plastic, wherein the cover has an atomic layer deposition (ALD) coating on the outside and on the inside, the ALD coating on the outside and/or the inside is covered by a hard coating.

12. Mobile reality capture device according to claim 1, wherein the cover has an anti-reflex (AR) coating on the inside and/or on the outside, and wherein the cover has on the inside and/or on the outside an area, which is free of the AR coating, the AR coating is applied on an inside circumferential band, which covers a limited elevation range.

13. Mobile reality capture device according to claim 1, wherein the cover has a hemispherical head part, the hemispherical head part comprises a planar area with a planar surface both on the outside and the inside, wherein the planar area is arranged at zenith.

14. Mobile reality capture device according to claim 13, wherein the planar area is specifically foreseen for mounting an additional sensor, particularly a global navigation satellite system (GNSS) transceiver, or wherein the planar area is specifically foreseen for providing a zenith LIDAR measurement by the laser scanner.

15. Mobile reality capture device according to claim 1, wherein the localization unit is configured to determine the trajectory with six degrees of freedom, namely involving position and orientation of the mobile reality capture device, the mobile reality capture device is configured for simultaneous localization and mapping (SLAM) to generate a three-dimensional map by involving data of the IMU, image data of the camera unit for visual simultaneous localization and mapping (VSLAM), and LIDAR data for LIDAR based simultaneous localization and mapping (LIDAR-SLAM).

16. Mobile reality capture device configured to be carried and moved by a person and to be moved during a measuring process for generating a digital representation of an environment, comprising:

a localization unit, particularly comprising an inertial measurement unit (IMU), the localization unit being configured for generating localization data for determining a trajectory of the mobile reality capture device, a laser scanner configured to carry out, during movement of the mobile reality capture device, a scanning movement of a laser measurement beam relative to two rotation axes, and, based thereof, to generate light detection and ranging (LIDAR) data for generating a three-dimensional point cloud, and a camera unit arranged on a lateral surface of the mobile reality capture device, the lateral surface defining a standing axis of the mobile reality capture device, wherein the lateral surface is circumferentially arranged around the standing axis, wherein the camera unit is configured to provide for image data which cover a visual field of more than 180° around the standing axis, particularly 360°, wherein the camera unit comprises multiple cameras circumferentially arranged on the lateral surface and the mobile reality capture device is configured to generate from the image data a panoramic image, namely wherein individual images of the multiple cameras are stitched together to form an image having a wider field of view than the individual images, wherein the laser scanner comprises:

a support, mounted on the base and being rotatable relative to the base, and a rotating body for deflecting the outgoing laser measurement beam and returning parts of the laser measurement beam, the rotating body being mounted on the support and being rotatable relative to the support, wherein the generation of the LIDAR data comprises:

a continuous rotation of the support relative to the base and a continuous rotation of the rotating body relative to the support, and emission of the laser measurement beam via the rotating body, which continuously rotates, and detection of parts of the laser measurement beam returning via the rotating body, wherein the laser scanner is configured that the continuous rotation of the rotating body relative to the support is faster than the continuous rotation of the support relative to the base, the continuous rotation of the support is at least 0.1 Hz and the continuous rotation of the rotating body is at least 50 Hz.

17. Mobile reality capture device according to claim 16, wherein the laser scanner is configured that for generating the LIDAR data the two rotation axes rotate faster than 0.1 Hz, particularly faster than 1 Hz, wherein the LIDAR data are generated with a point acquisition rate of at least 300,000 points per second, particularly at least 500,000 points per second.

18. Mobile reality capture device according to claim 16, wherein the mobile reality capture device is configured for simultaneous localization and mapping (SLAM) to generate a three-dimensional map of the environment by involving:

data of the IMU (IMU-SLAM), image data of the camera unit for visual simultaneous localization and mapping (VSLAM), and LIDAR data for LIDAR based simultaneous localization and mapping (LIDAR-SLAM).

19. Mobile reality capture device according to claim 16, wherein the mobile reality capture device is configured to generate a three-dimensional vector file model of the environment, particularly a mesh.

20. Mobile reality capture device according to claim 16, wherein the mobile reality capture device comprises an attachment unit for attaching an accessory device to the mobile reality capture device, wherein the attachment unit has:

a fixing unit with a receptacle, configured to receive a counterpart to the receptacle and to secure the counterpart in the receptacle, particularly in a way which maintains a, particularly predetermined, orientation of the counterpart relative to the receptacle, and a wireless data bus, configured to provide for one or bi-directional data transfer between the accessory device and the mobile reality capture device.

21. Mobile reality capture device according to claim 20, wherein the fixing unit comprises at least one of a magnet, a part of a hook and loop fastener, a female or male part of a plug-in connection, and a clamp.

22. Mobile reality capture device according to claim 20, wherein the attachment unit has an inductive power exchange unit, configured to provide power supply from the mobile reality capture device to an accessory device, which is secured by the fixing unit, and/or from the secured accessory device to the mobile reality capture device.

23. Mobile reality capture device according to claim 20, wherein the mobile reality capture device comprises a sensing unit, configured to detect an accessory device within reach for wireless data transfer by the wireless data bus, and to activate the wireless data bus for starting the data transfer upon detection of the accessory device within reach, and/or to detect that an accessory device is secured by the fixing unit, and to activate the inductive power exchange unit for starting the power exchange upon detection of the secured accessory device.

* * * * *